US012801058B2

(12) United States Patent
Goda

(10) Patent No.: US 12,801,058 B2
(45) Date of Patent: Nov. 17, 2026

(54) IMAGE FORMING APPARATUS FOR FORMING IMAGE USING PLURALITY OF EXPOSURE HEADS

(71) Applicant: CANON KABUSHIKI KAISHA, Tokyo (JP)

(72) Inventor: Junichi Goda, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/175,007

(22) Filed: Apr. 10, 2025

(65) Prior Publication Data

US 2025/0237970 A1 Jul. 24, 2025

Related U.S. Application Data

(63) Continuation of application No. 18/599,286, filed on Mar. 8, 2024, now Pat. No. 12,306,552, which is a (Continued)

(30) Foreign Application Priority Data

Mar. 24, 2022 (JP) ................................ 2022-048420

(51) Int. Cl.
*G03G 15/01* (2006.01)
*G03G 15/043* (2006.01)
*G03G 15/23* (2006.01)
*H04N 1/393* (2006.01)
*H04N 1/60* (2006.01)

(52) U.S. Cl.
CPC ......... *G03G 15/011* (2013.01); *G03G 15/043* (2013.01); *G03G 15/23* (2013.01); *G03G 15/231* (2013.01); *H04N 1/393* (2013.01); *H04N 1/6008* (2013.01)

(58) Field of Classification Search
CPC .... G03G 15/011; G03G 15/043; G03G 15/23; G03G 15/231; H04N 1/393; H04N 1/6008
See application file for complete search history.

(56) References Cited

U.S. PATENT DOCUMENTS 7,391,430 B2 6/2008 Mitani
11,953,840 B2 4/2024 Goda
(Continued)

FOREIGN PATENT DOCUMENTS

JP 2005-170033 A 6/2005
JP 2008-275692 A 11/2008
(Continued)

*Primary Examiner* — Joseph S Wong
(74) *Attorney, Agent, or Firm* — Venable LLP

(57) ABSTRACT

A first exposure head forms an image corresponding to a first color based on a first synchronization signal. A second exposure head forms the image corresponding to a second color based on a second synchronization signal. A period of the first synchronization signal in a case where the first exposure head is to form the image for a second surface of a sheet is shorter than a period of first synchronization signal in a case where the first exposure head is to form the image for a first surface of the sheet. A period of the second synchronization signal in a case where the second exposure head is to form the image for the second surface is shorter than a period of the second synchronization signal in a case where the second exposure head is to form the image for the first surface.

18 Claims, 17 Drawing Sheets

Related U.S. Application Data continuation of application No. 18/183,242, filed on Mar. 14, 2023, now Pat. No. 11,953,840.

(56) References Cited

U.S. PATENT DOCUMENTS

| | | | |
|---|---|---|---|
| 2005/0128538 | A1 | 6/2005 | Mitani |
| 2015/0261117 | A1 | 9/2015 | Suzuki et al. |
| 2021/0055669 | A1 | 2/2021 | Yoshida et al. |
| 2021/0303844 | A1 | 9/2021 | Goda et al. |
| 2023/0273544 | A1 | 8/2023 | Seki et al. |

FOREIGN PATENT DOCUMENTS

| | | | |
|---|---|---|---|
| JP | 4531491 | B2 | 8/2010 |
| JP | 2015-112856 | A | 6/2015 |

FIG. 3A
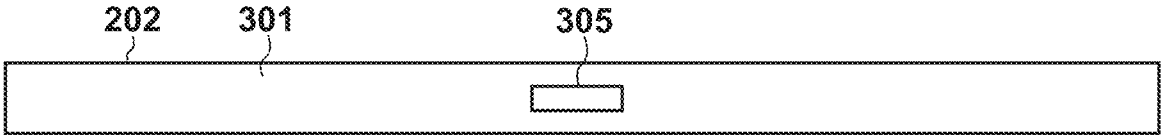
FIG. 3B
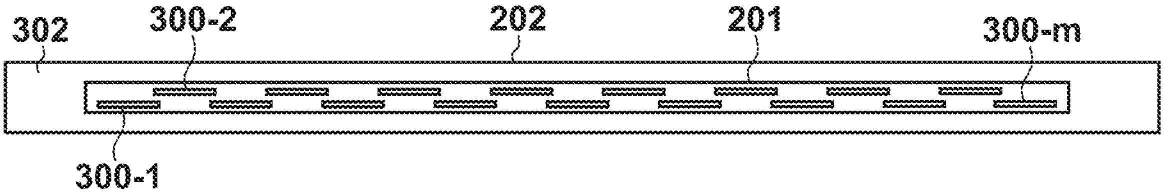
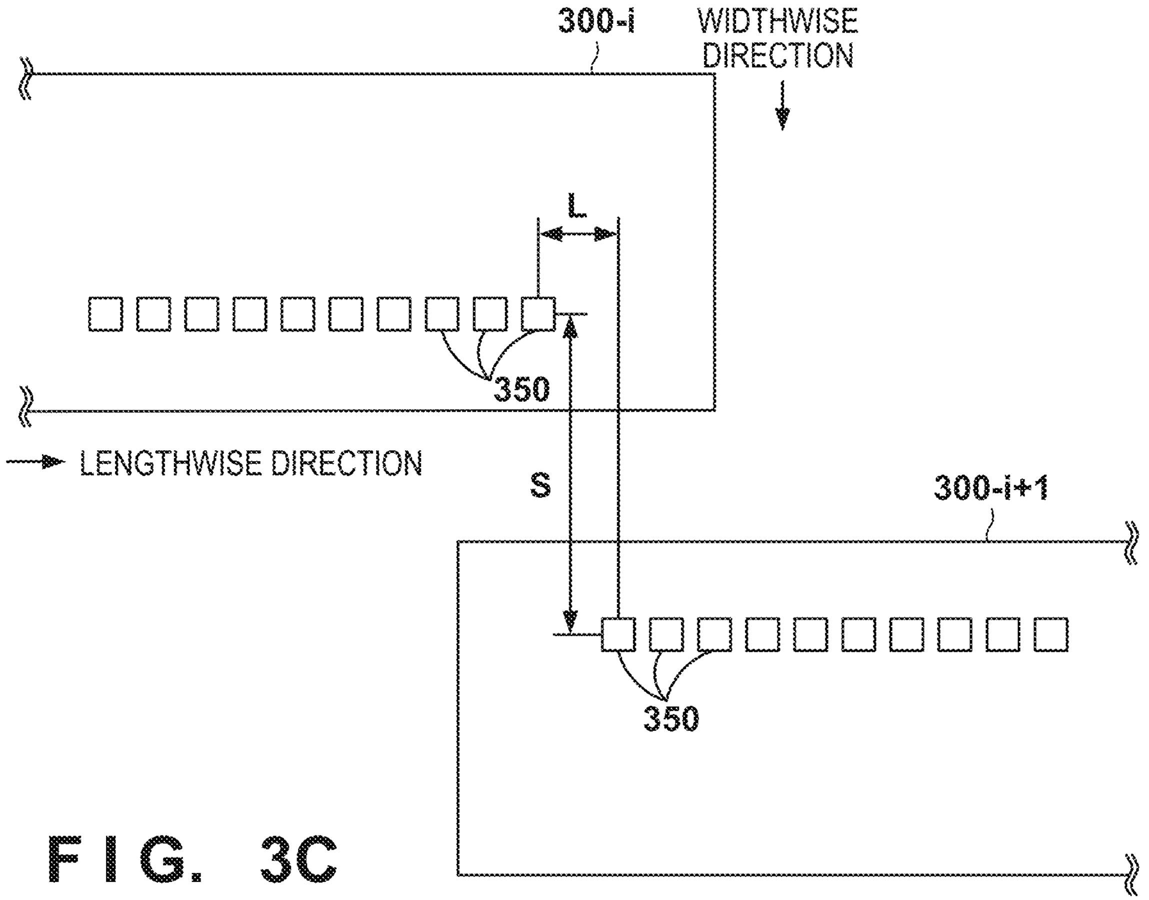
FIG. 3C

IMAGE FORMING APPARATUS FOR FORMING IMAGE USING PLURALITY OF EXPOSURE HEADS

This application is a continuation of application Ser. No. 18/599,286 filed Mar. 8, 2024, which is a continuation of application Ser. No. 18/183,242 filed Mar. 14, 2023, U.S. Pat. No. 11,953,840 B2.

BACKGROUND OF THE INVENTION

Field of the Invention

The present invention relates to an image forming apparatus for forming an image using a plurality of exposure heads.

Description of the Related Art

Conventionally, image forming apparatuses for forming a toner image on a photosensitive body by exposing the photosensitive body by an exposure head using a plurality of LEDs are known. There are cases where an image is scaled (enlarged or reduced) in a sub-scanning direction in the image forming apparatuses. Japanese Patent No. 4531491 realizes infinitesimal scaling in a sub-scanning direction of an image by changing a period at which a line synchronization signal for defining an exposure timing in the sub-scanning direction is created.

Incidentally, there are cases where one desires to change a magnification in the sub-scanning direction for each page when printing a plurality of pages. For example, it becomes necessary to change the magnification for each page when a first page is an image of a front surface of a sheet and a second page is an image of a back surface of the sheet. Specifically, the sheet temporarily shrinks due to heat processing for fixing a toner image of the front surface, and therefore, a toner image of the back surface needs to be reduced accordingly. This makes it so that a position of the image of the front surface and a position of the image of the back surface coincide when the sheet returns to its original size.

However, it is difficult to change the magnification for each page in color image forming apparatuses. The color image forming apparatuses sequentially transfer toner images, each of a different color, to an intermediate transfer body or a sheet. That is, timings at which each of yellow “Y”, magenta “M”, cyan “C”, and black “K” toner images is formed are different. For example, there are cases where, at a given timing, a second page is being outputted for the Y color but a first page is being outputted for each of the M, C, and K colors. If a period of a line synchronization signal of each of the M, C, and K colors is changed in accordance with an output timing of a second page of the Y color, the magnification in the sub-scanning direction of each of M, C, and K-color images will be changed partway through the first page. Consequently, a position at which a Y-color image is formed and the positions at which each of M, C, and K-color images is formed will be misaligned partway through the first page. Consequently, a formed color image will be distorted.

SUMMARY OF THE INVENTION

The present disclosure provides an image forming apparatus comprising: a first photosensitive drum configured to be rotationally driven; a first exposure head including a first plurality of light-emitting portions arranged in a direction along an axis of rotation of the first photosensitive drum, and configured to form an image corresponding to a first color on a surface of the first photosensitive drum by light emitted from the first plurality of light-emitting portions; a second photosensitive drum configured to be rotationally driven; a second exposure head including a second plurality of light-emitting portions arranged in a direction along an axis of rotation of the second photosensitive drum, and configured to form an image corresponding to a second color on a surface of the second photosensitive drum by light emitted from the second plurality of light-emitting portions; a transfer unit configured to transfer a toner image corresponding to the first color and a toner image corresponding to the second color to a first surface of a sheet; a fixing unit configured to fix to the first surface of the sheet the toner image corresponding to the first color and the toner image corresponding to the second color transferred to the first surface of the sheet by the transfer unit; a conveyance unit configured to invert the first surface and a second surface of the sheet on which the images have been fixed to the first surface and convey the sheet to the transfer unit, the second surface being a surface on an opposite side of the first surface; and at least one processor configured to: generate a first synchronization signal at a period corresponding to a resolution of an image in a direction corresponding to a direction of rotation of the first photosensitive drum, and generate a second synchronization signal at a period corresponding to a resolution of an image in a direction corresponding to a direction of rotation of the second photosensitive drum, a period at which the first synchronization signal is generated in a case where the first exposure head forms the image to be fixed to the second surface of the sheet being shorter than a period at which the first synchronization signal is generated in a case where the first exposure head forms the image to be fixed to the first surface of the sheet, and a period at which the second synchronization signal is generated in a case where the second exposure head forms the image to be fixed to the second surface of the sheet being shorter than a period at which the second synchronization signal is generated in a case where the second exposure head is to form the image to be fixed to the first surface of the sheet; and cause the first exposure head to form one line of the image corresponding to the first color along the axis of rotation of the first photosensitive drum based on the first synchronization signal, and cause the second exposure head to form one line of the image corresponding to the second color along the axis of rotation of the second photosensitive drum based on the second synchronization signal, the second exposure head forming an image to be fixed to the first surface of the sheet on the surface of the second photosensitive drum at a timing at which the first exposure head starts forming an image to be fixed to the second surface of the sheet on the surface of the first photosensitive drum.

Further features of the present invention will become apparent from the following description of exemplary embodiments (with reference to the attached drawings).

BRIEF DESCRIPTION OF THE DRAWINGS

FIGS. 3A to 3C are diagrams for explaining a printed circuit board.

DESCRIPTION OF THE EMBODIMENTS

Figure 1:
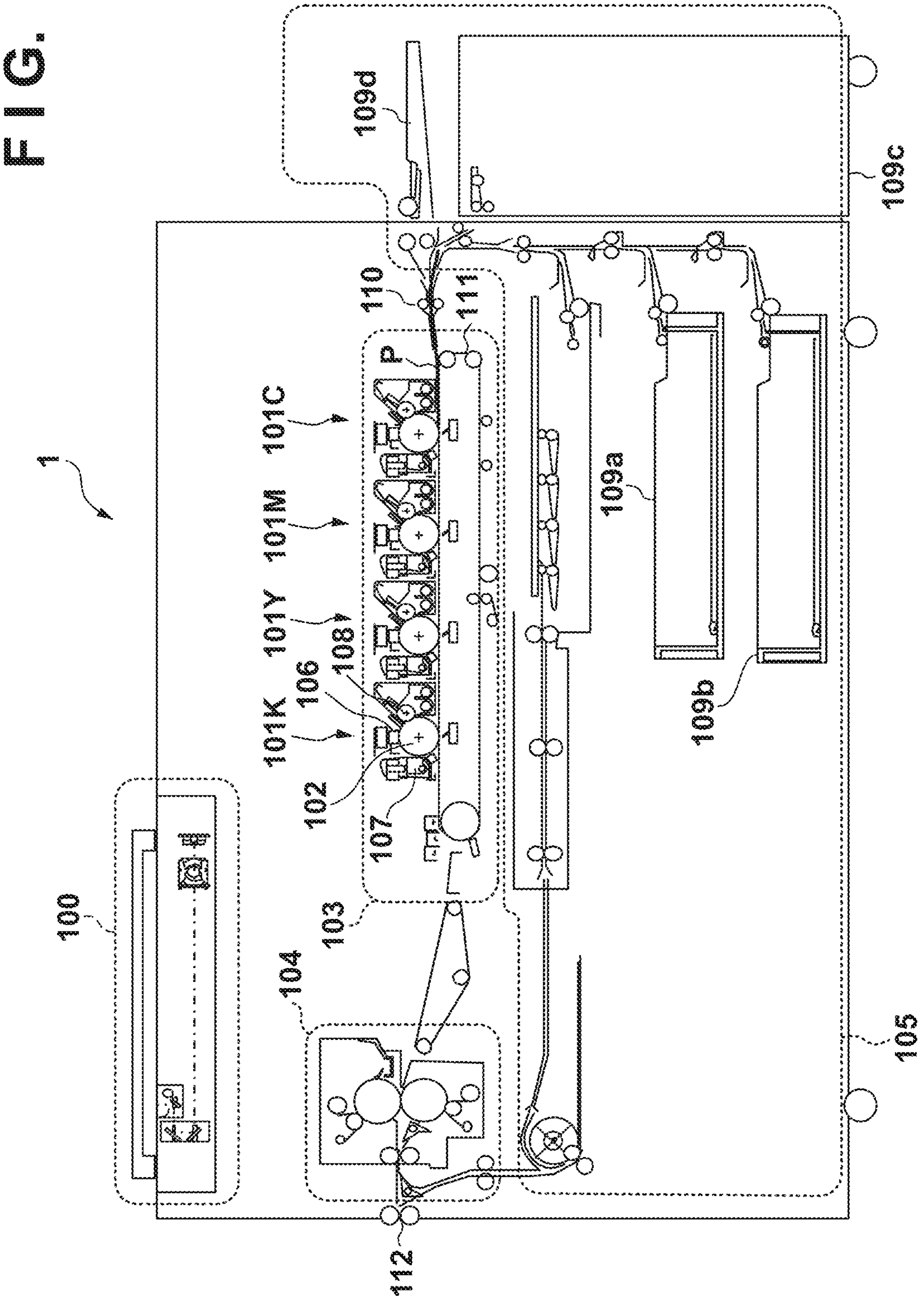
FIG. 1 is a diagram for explaining an image forming apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

<Image Forming Apparatus>

FIG. 1 illustrates an image forming apparatus 1, which is an electrophotographic copy machine. However, the image forming apparatus 1 may be realized as a monochrome printer, full-color printer, facsimile communication apparatus, or multifunction peripheral.

A scanner unit 100 is a document reading apparatus for creating image data by optically reading a document image by applying illumination light to a document placed on a document table and converting the reading result into an electric signal. A printer engine 103 forms a toner image on a sheet P. The printer engine 103 rotates a photosensitive drum 102. A charger 107 charges a surface of the photosensitive drum 102 so as to make a potential on the surface of the photosensitive drum 102 uniform. An exposure head 106 forms an electrostatic latent image on the surface of the photosensitive drum 102 by exposing the surface of the photosensitive drum 102 with light corresponding to image data. A developer 108 forms a toner image by attaching toner to the electrostatic latent image formed on the photosensitive drum 102. The toner image arrives at a transfer nip by the photosensitive drum 102 further rotating. At the transfer nip, the sheet P is conveyed while being held between the photosensitive drum 102 and a transfer belt 111. The toner image is thus transferred from the photosensitive drum 102 to the sheet P.

The printer engine 103 includes four image forming units 101C, 101M, 101Y, and 101K corresponding to yellow, magenta, cyan, and black (YMCK), which are toner colors. A full-color image is formed on the sheet P by the four image forming units 101C, 101M, 101Y, and 101K transferring toner images, each of a different color, to the sheet P.

A feeding unit 105 feeds the sheet P from a pre-designated feeding apparatus among feeding apparatuses 109*a* and 109*b* provided in a main body of the image forming apparatus 1, a feeding apparatus 109*c* provided outside the main body, and a manual feeding apparatus 109*d*. The fed sheet P is conveyed to a registration roller 110. The registration roller 110 conveys the sheet P so that a timing at which a toner image arrives at a transfer nip and a timing at which the sheet P arrives at that transfer nip coincide. The transfer belt 111 conveys to a fixer 104 the sheet P to which the toner images have been transferred.

The fixer 104 fixes the toner images onto the sheet P by applying pressure and heat to the toner images and the sheet P. A discharge roller 112 discharges the sheet P out of the image forming apparatus 1.

When double-sided image formation is to be performed, the discharge roller 112 conveys the sheet P on which the toner images have been formed on a first surface to the feeding unit 105. The feeding unit 105 conveys the sheet P to the registration roller 110. The registration roller 110 conveys the sheet P to the printer engine 103 again. As a result, toner images are formed on a second surface of the sheet P. Then, the fixer 104 fixes the toner images onto the sheet P. The discharge roller 112 discharges the sheet P out of the image forming apparatus 1.

<Exposure Head>

Figure 2A:
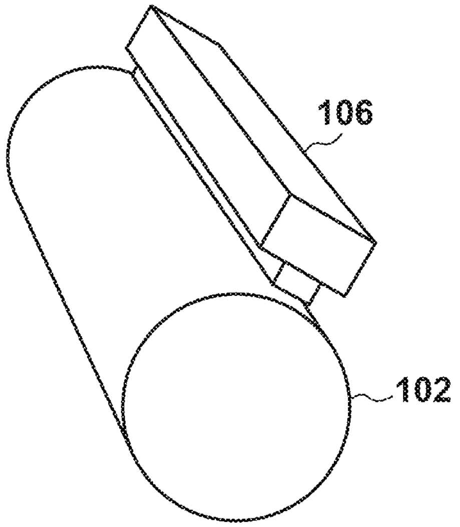
FIGS. 2A and 2B are diagrams for explaining an arrangement of a photosensitive drum and an exposure head.
Figure 2B:
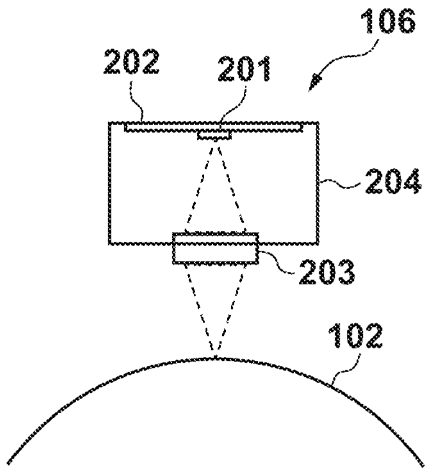

FIG. 2A is a perspective view of the exposure head 106 for exposing the photosensitive drum 102. FIG. 2B is a schematic cross-sectional view of the photosensitive drum 102 and the exposure head 106. The exposure head 106 includes a light-emitting element group 201, a printed circuit board 202, a rod lens array 203, and a housing 204. Light outputted from the light-emitting element group 201 mounted on the printed circuit board 202 is focused by the rod lens array 203 and irradiated onto the surface of the photosensitive drum 102. The printed circuit board 202 and the rod lens array 203 are fixed with respect to the housing 204.

Assembly and adjustment work are performed individually for the exposure head 106. Adjustment work includes adjustment of a size of a spot at a focal position (focus adjustment) and adjustment of the amount of light. In focus adjustment, a mounting position of the rod lens array 203 is adjusted such that a distance between the rod lens array 203 and the light-emitting element group 201 is a predetermined value. In adjustment of the amount of light, a driving current of each light-emitting element is adjusted such that the amount of light focused through the rod lens array 203 is a predetermined amount of light by causing a plurality of light-emitting elements included in the light-emitting element group 201 to sequentially emit light one at a time.

<Configuration of Light-Emitting Element Group>

FIG. 3A illustrates a non-mounting surface 301 of the printed circuit board 202. Although light-emitting elements are not mounted, other electronic components, such as a connector 305 are mounted on the non-mounting surface 301. A cable (power supply line and signal line) for carrying various signals, such as a clock signal, to the printed circuit board 202 is connected to the connector 305.

As illustrated in FIG. 3B, the light-emitting element group 201 is mounted on a mounting surface 302 of the printed circuit board 202. The mounting surface 302 is a surface opposite to the non-mounting surface 301. The light-emitting element group 201 includes m light-emitting element arrays 300-1 to 300-*m* arranged in a staggered manner. The light-emitting element arrays 300-1 to 300-*m* may be collectively referred to as light-emitting element arrays 300.

As illustrated in FIG. 3C, a plurality of light-emitting elements 350 are arranged along a lengthwise direction of the light-emitting element arrays 300 in each of the light-emitting element arrays 300-1 to 300-*m*.

As illustrated in FIG. 3B, the light-emitting element arrays 300 are arranged in two rows. In a first row, the light-emitting element array 300-1, the light-emitting element array 300-3, . . . , and a light-emitting element array 300-*m*−1 are provided. In a second row, the light-emitting element array 300-2, the light-emitting element array 300-4, . . . , and a light-emitting element array 300-*m* are provided.

As illustrated in FIG. 3C, a distance between two adjacent light-emitting elements 350 in a given light-emitting element array 300 is L. The distance L is a distance in the lengthwise direction of the light-emitting element arrays 300. At a resolution of 1200 dpi, L=approximately 21.16 μm. This is a distance equivalent to one pixel at 1200 dpi. A distance between a rightmost light-emitting element 350 of an i-th light-emitting element array 300-*i* and a leftmost light-emitting element 350 of an i+1-th light-emitting element array 300-*i*+1 is also L. i is any integer from 1 to m−1. As illustrated in FIG. 3C, in a widthwise direction of the light-emitting element arrays 300, a distance S between the rightmost light-emitting element 350 of the light-emitting element array 300-*i* and the leftmost light-emitting element 350 of the light-emitting element array 300-*i*+1 is approximately 105 μm. This is a distance equivalent to five pixels at 1200 dpi. The distances L and S are only one example.

<Configuration of Light-Emitting Element Array>

Figure 4:
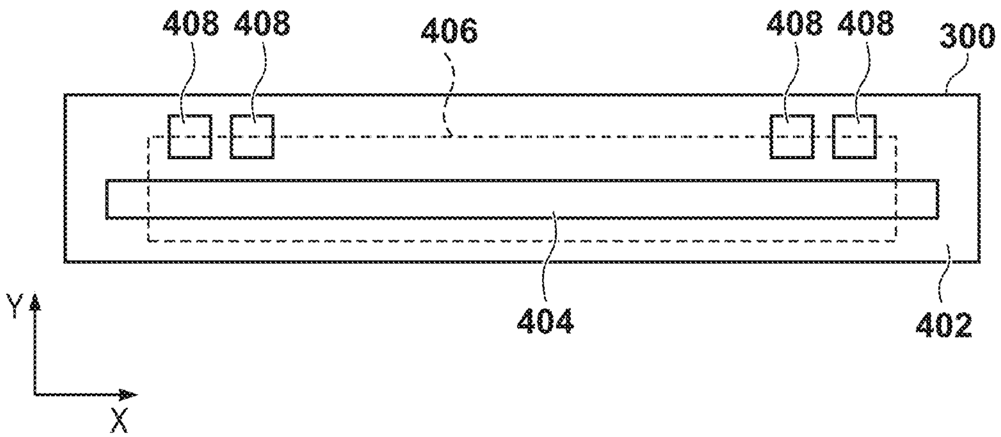
FIG. 4 is a diagram for explaining a light-emitting element array.

FIG. 4 is a plan view of a light-emitting element array 300. An X direction represents the lengthwise direction of the photosensitive drum 102. A Y direction represents a direction of rotation of the photosensitive drum 102. The light-emitting element array 300 includes a light emission substrate 402, a light-emitting unit 404 including a plurality of light-emitting elements 350 mounted on the light emission substrate 402, and WB pads 408 mounted on the light emission substrate 402. WB is an abbreviation for wire bonding. A circuit unit 406 for controlling the light-emitting unit 404 is incorporated in the light emission substrate 402. The circuit unit 406 includes both an analog driving circuit (analog part) and a digital control circuit (digital part). A power supply to the circuit unit 406 and signal input to and output from the light-emitting element array 300 are performed via WB pads 408.

<Light-Emitting Unit>

Figure 5:
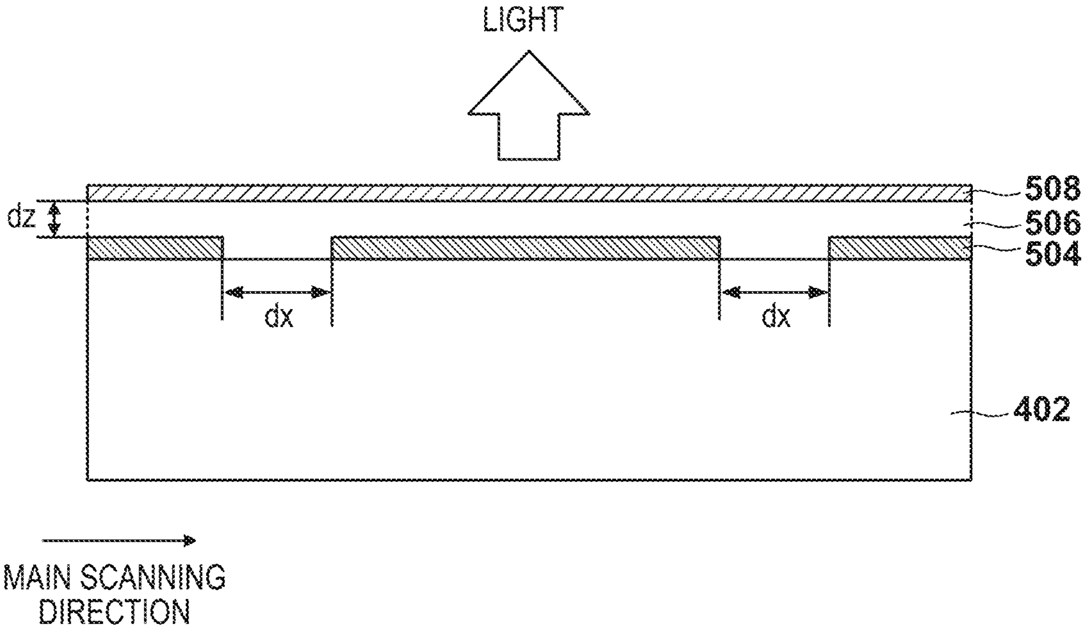
FIG. 5 is a diagram for explaining light-emitting elements.

FIG. 5 illustrates part of a cross section of a portion in which the light-emitting elements 350 are provided. A plurality of lower electrodes 504 are formed on the light emission substrate 402. A light-emitting layer 506 is provided on the lower electrodes 504, and an upper electrode 508 is provided on the light-emitting layer 506. The upper electrode 508 is one common electrode for the plurality of lower electrodes 504. When a predetermined voltage is applied between the lower electrodes 504 and the upper electrode 508, a current flows from the lower electrodes 504 to the upper electrode 508, and the light-emitting layer 506 thereby emits light. That is, the light-emitting layer 506 corresponding to a region in which the lower electrodes 504 are provided emits light. The light-emitting elements 350 in the following description correspond to the lower electrodes 504; however, for example, the light-emitting elements may correspond to the light-emitting layer.

By setting a length dx to be greater than a length dz between the lower electrodes 504 and the upper electrode 508, it is possible to suppress a leakage current between the adjacent lower electrodes 504 and prevent adjacent light-emitting elements 350 from erroneously emitting light.

For example, an organic EL film may be used for the light-emitting layer 506. Also, an inorganic EL film may be used for the light-emitting layer 506. The upper electrode 508 is configured by a transparent electrode, such as indium tin oxide (ITO), so as to transmit a light emission wavelength of the light-emitting layer 506. In the present embodiment, the entire upper electrode 508 transmits the light emission wavelength of the light-emitting layer 506; however, the entire upper electrode 508 does not necessarily have to transmit the light emission wavelength. Specifically, a region through which light from each light-emitting element 350 (corresponding to lower electrodes 504) is emitted need only transmit light of the light emission wavelength.

In the present embodiment, one light-emitting layer 506 is provided for the lower electrodes 504 provided in the light-emitting element array 300-*i* (i is an integer greater than or equal to 1 and less than or equal to m). That is, the light-emitting layer 506 is common across all the lower electrodes 504 provided in the light-emitting element array 300-*i*; however, the present invention is not limited to this. For example, among the plurality of lower electrodes 504 provided in the light-emitting element array 300-*i*, a first plurality of lower electrodes 504 may be covered by a first light-emitting layer 506. Among the plurality of lower electrodes 504 provided in the light-emitting element array 300-*i*, a second plurality of lower electrodes 504 may be covered by a second light-emitting layer 506. In addition, a light-emitting layer 506 may be individually provided for each of the plurality of lower electrodes 504 provided in the light-emitting element array 300-*i*.

In the present embodiment, a configuration in which organic EL is used as a mechanism for emitting light has been described; however, LEDs may be used as light emitting elements. EL is an abbreviation for electro-luminescence. LED is an abbreviation for light-emitting diode. When LEDs are used as light-emitting elements, one light-emitting element 350 corresponds to one LED.

Figure 6:
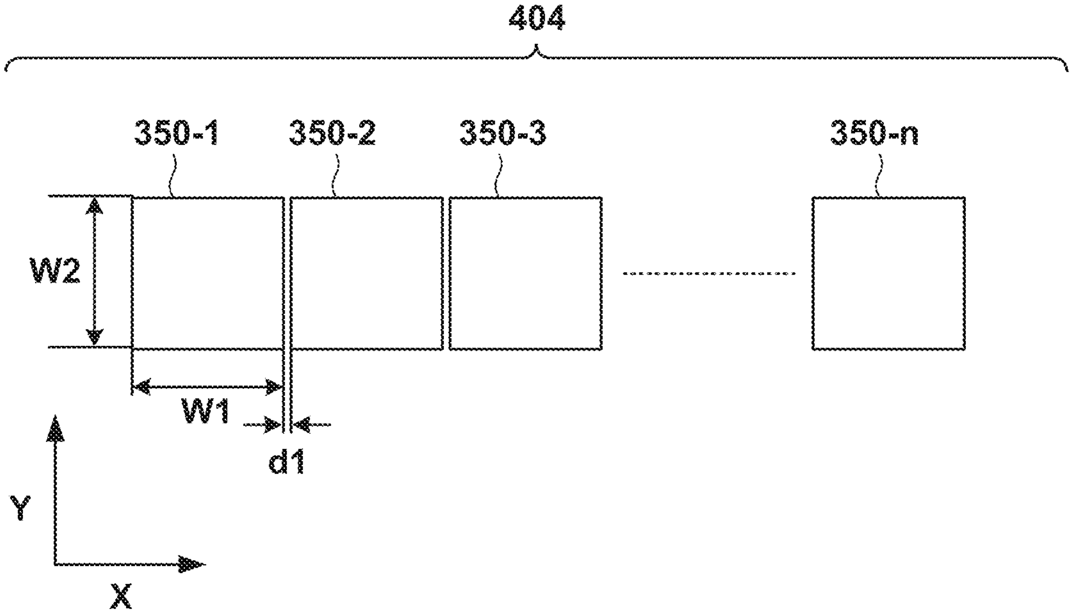
FIG. 6 is a diagram for explaining an arrangement of light-emitting elements.

FIG. 6 illustrates a row of light-emitting elements (row of lower electrodes) constituting the light-emitting unit 404. The light-emitting unit 404 includes n light-emitting elements 350 arranged in a row. Each of the plurality of light-emitting elements 350 is arranged at a predetermined pitch (distance L=21.16 μm) in an X direction.

In FIG. 6, W1 is a length of a light-emitting element 350 in the X direction. dx is a bordering space between two adjacent light-emitting elements 350 in the X direction. W2 is a length of a light-emitting element 350 in the Y direction. The length W2 is determined in consideration of a scan rate and resolution in the Y direction. In one example, the lengths W1 and W2 are 20.9 μm and the bordering space dx is 0.26 μm.

<Control Block>

Figure 7A:
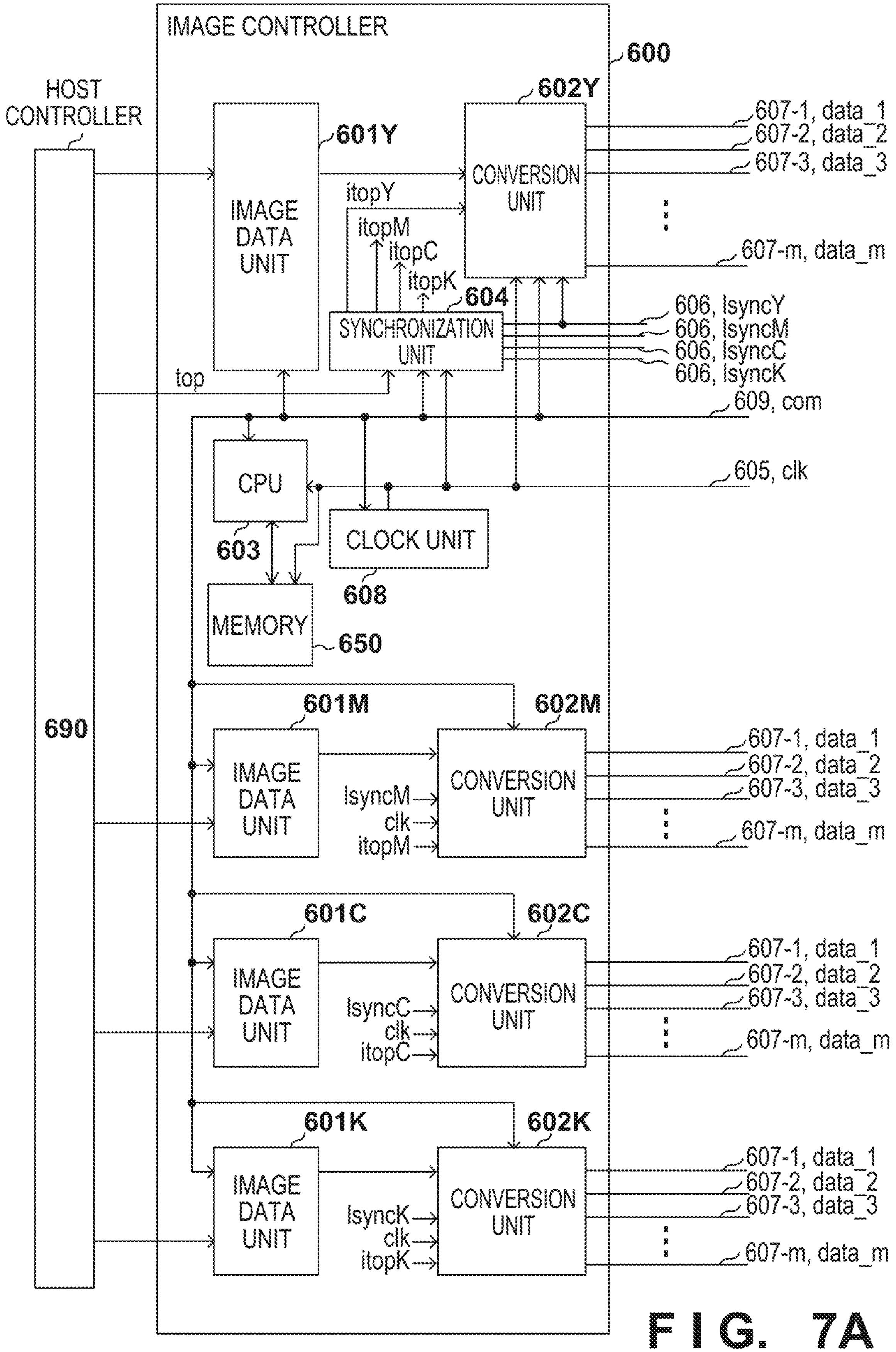
FIG. 7A is a block diagram illustrating an image controller.
Figure 7B:
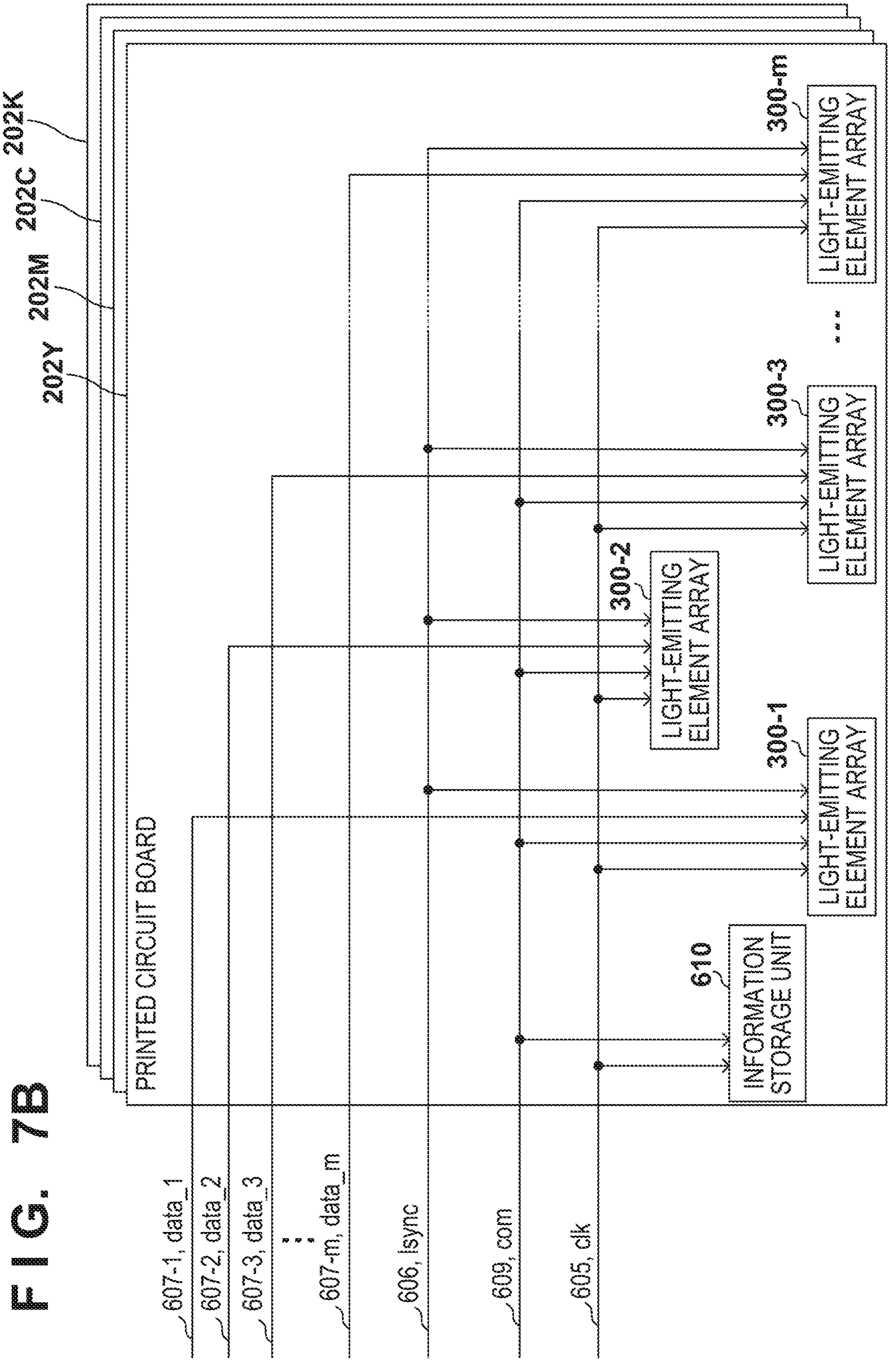
FIG. 7B is a block diagram illustrating printed circuit boards.

FIG. 7A illustrates an image controller 600. FIG. 7B illustrates printed circuit boards 202Y, 202M, 202C, and 202K. Since the printed circuit boards 202Y, 202M, 202C, and 202K are common components, the printed circuit board

202Y will be described as a representative example. In some cases, characters YMCK at the end of reference numerals are omitted when matters common to YMCK are described.

The image controller 600 is connected to a host controller 690 and is a control circuit for generating and transmitting to each of the printed circuit boards 202 a signal group for controlling the printed circuit boards 202. Such a signal group includes a clock signal clk, image data data_1 to data_m, a line synchronization signal lsync, and a communication signal com. The clock signal clk is a signal that is generated by a clock unit 608 and serves as a reference for operation in various circuits. The image data data_1 to data_m is image data supplied to the light-emitting element arrays 300-1 to 300-*m*, respectively. The image data data_1 to data_m is generated for each of the YMCK colors. The line synchronization signal lsync represents a write start timing of an image in the sub-scanning direction. The line synchronization signal lsync is generated for each of the YMCK colors. An image is formed by sequentially exposing different positions in the sub-scanning direction. Generally, exposure is performed for each line, and a spacing between adjacent lines corresponds to a resolution of an image in the sub-scanning direction. Therefore, a period of the line synchronization signal lsync is a parameter for defining a line spacing (resolution). Usually, the period of the line synchronization signal lsync is the same for YMCK; however, in some cases, the period may be changed for each page. It is necessary to cause the magnification in the sub-scanning direction for the first surface (i-th page) of the sheet P and the magnification in the sub-scanning direction for the second surface (i+1-th page) of the sheet P to coincide. However, the sheet P temporarily shrinks due to heat processing for fixing toner images on the first surface to the sheet P. Toner images are formed on the second surface of this temporarily-shrunk sheet P. When a temperature of the sheet P decreases, the sheet P absorbs moisture and stretches, thereby causing the toner images on the second surface to be enlarged, and therefore, magnification of the toner images on the first surface and magnification of the toner images on the second surface will not coincide. Thus, by intentionally reducing magnification of electrostatic latent images on the second surface with respect to magnification of electrostatic latent images on the first surface, the magnification of the toner images on the first surface and the magnification of the toner images on the second surface will coincide.

Incidentally, as illustrated in FIG. 1, each of the YMCK toner images is sequentially transferred to the sheet P. Therefore, while the image forming unit 101K is forming a latent image of the first surface, the image forming unit 101Y may begin forming a latent image of the second surface. In order to cause the magnification of the latent images of the second surface and the magnification of the latent images of the first surface to be different, it is necessary to independently control an lsyncK signal, which is a line synchronization signal for the image forming unit 101K, and an lsyncY signal, which is a line synchronization signal for the image forming unit 101Y. If the period of the lsync Y signal and the period of the lsyncK signal are changed at the same time, the magnification of the black image on the first surface changes partway through, causing color misregistration.

The communication signal com is a communication signal that is transmitted or received between a CPU 603 and a printed circuit board 202. The clock signal clk is transmitted from the clock unit 608 to the printed circuit board 202 and the like via a clock signal line 605. A line synchronization signal lsync is transmitted from a synchronization unit 604 to the printed circuit board 202, the CPU 603, a conversion unit 602, and the like via a synchronization signal line 606. The image data data_1 to data_m is transmitted to the light-emitting element arrays 300-1 to 300-*m* via image signal lines 607-1 to 607-*m*, respectively. The communication signal com is transmitted from the CPU 603 to an information storage unit 610 and the light-emitting element arrays 300-1 to 300-*m* via a communication signal line 609.

An image data unit 601 subjects image data received from the scanner unit 100 or a computer external to the image forming apparatus 1 via the host controller 690 to image processing and outputs the image data to a conversion unit 602. The image processing includes, for example, dithering processing to be performed at a resolution instructed by the CPU 603. For example, dithering processing is performed at a resolution of 2400 dpi in the sub-scanning direction and a resolution of 1200 dpi in a main scanning direction. The image data is 8 bits wide and represents, for example, the amount of light to be lit.

The clock unit 608 is an oscillation circuit for generating a fixed periodic clock signal clk. The clock signal clk is supplied to the CPU 603, the synchronization unit 604, the conversion units 602, and the printed circuit boards 202. The CPU 603 executes the following processing according to a control program stored in a ROM region of a memory 650. The memory 650 also includes a RAM region for holding variables and the like.

The CPU 603 determines a period at which a line synchronization signal lsync is to be generated. A period of generation is calculated based on, for example, a speed of rotation of the photosensitive drum 102 (information on a speed at which the surface of the photosensitive drum 102 moves in a direction of rotation) and a magnification in the sub-scanning direction of an image. The CPU 603 sets in the synchronization unit 604 the period at which the line synchronization signal lsync is to be generated. Further, the CPU 603 receives the line synchronization signal lsync from the synchronization unit 604 and identifies a timing at which the generation of the line synchronization signal lsync has been completed.

A conversion unit 602 generates the image data data_1 to data_m by dividing one line of image data outputted from an image data unit 601. The conversion unit 602 transmits the image data data_1 to data_m to a printed circuit board 202 in synchronization with a line synchronization signal lsync and the clock signal clk.

The synchronization unit 604 generates line synchronization signals lsyncY, lsyncM, lsyncC, and lsyncK at the period of generation instructed by the CPU 603. The line synchronization signal lsync Y is supplied to the printed circuit board 202Y, the conversion unit 602Y, and the CPU 603. The line synchronization signal lsyncM is supplied to the printed circuit board 202M, the conversion unit 602M, and the CPU 603. The line synchronization signal lsyncC is supplied to the printed circuit board 202C, the conversion unit 602C, and the CPU 603. The line synchronization signal lsyncK is supplied to the printed circuit board 202K, the conversion unit 602K, and the CPU 603.

The synchronization unit 604 generates an itop signal for each of the YMCK colors based on a top signal supplied from the host controller 690 and supplies the generated signal to the corresponding conversion unit 602. The top signal is a signal indicating a leading edge of toner images to be formed on the sheet P. An itopY signal indicates a write start timing for a yellow electrostatic latent image. An itopM signal indicates a write start timing for a magenta electrostatic latent image. An itopC signal indicates a write start timing for a cyan electrostatic latent image. An itopK signal indicates a write start timing for a black electrostatic latent image. As illustrated in FIG. 1, timings at which each of the YMCK toner images is transferred to the sheet P are shifted. A time by which they are shifted is referred to as an inter-drum delay time and is determined in accordance with a conveyance distance between the image forming units 101Y, 101M, 101C, and 101K and a conveyance speed of the sheet P. The conversion units 602Y, 602M, 602C, and 602K start output of image data when the respectively corresponding itopY signal, itopM signal, itopC signal, and itopK signal are inputted.

As illustrated in FIG. 7B, in a printed circuit board 202, the light-emitting element arrays 300-*i* operate by being supplied with a line synchronization signal lsync, the clock signal clk, image data data_i, and the communication signal com. The information storage unit 610 is a storage circuit for storing head information. The head information includes the respective amounts of light emission of the light-emitting element arrays 300-1 to 300-*m*, positional information indicating mounting positions of the light-emitting element arrays 300-1 to 300-*m*, and the like. The CPU 603 accesses the information storage unit 610 via the communication signal line 609 to read out the head information and write setting information. The information storage unit 610 may store a driving current setting value that has been adjusted in the assembly process of the exposure head 106.

As illustrated in FIG. 7B, the clock signal line 605, the communication signal line 609 and the synchronization signal line 606 are connected to all of the light-emitting element arrays 300. The image signal lines 607 and the light-emitting element arrays 300 are connected in a one-to-one manner. That is, one image signal line 607 is connected to one light-emitting element array 300.

<Configuration of Circuit Unit>

Figure 8:
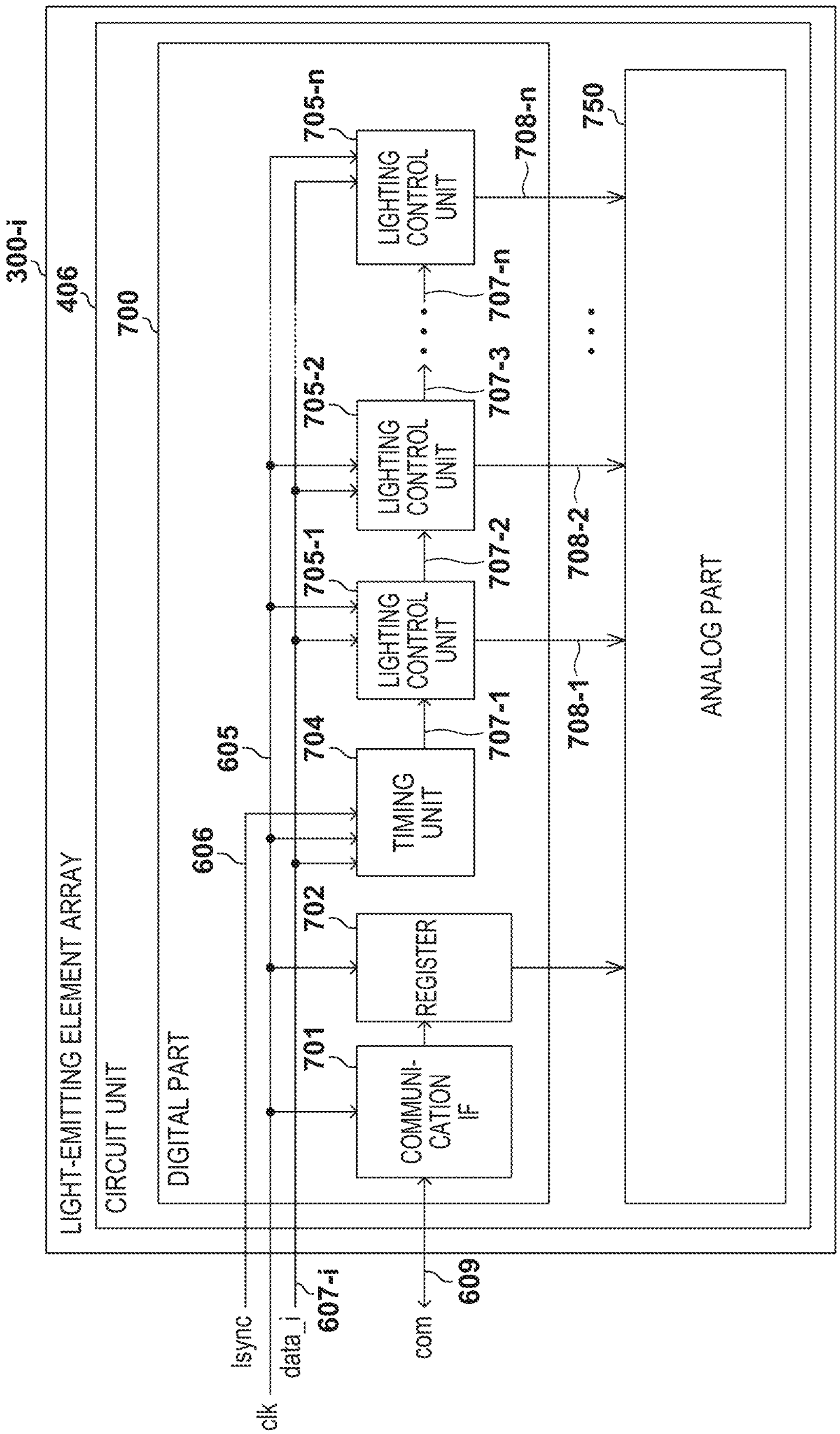
FIG. 8 is a block diagram illustrating a digital part.

FIG. 8 is a block diagram of the circuit unit 406 in the i-th light-emitting element array 300-*i* (i is an integer from 1 to m). The circuit unit 406 includes a digital part 700 and an analog part 750. The digital part 700 generates lighting signals for causing the light-emitting elements 350 to emit light based on setting values set in advance by the communication signal com, a line synchronization signal lsync, and image data data in synchronization with the clock signal clk. The digital part 700 outputs the lighting signals to the analog part 750 via lighting signal lines 708.

A communication IF 701 controls writing and reading of setting values to a register 702 based on the communication signal com from the CPU 603. The register 702 holds setting values necessary for operation of the light-emitting elements 350. The setting values include a value indicating a driving current to be set in the analog part 750.

A timing unit 704 generates a timing signal based on a line synchronization signal lsync and supplies the timing signal to a lighting control unit 705-1 via a signal line 707-1. The lighting control unit 705-1 obtains the image data data from the image signal line 607 in accordance with the timing signal. The number n of the lighting control units 705 and the number n of the light-emitting elements 350 coincide. That is, one lighting control unit 705 is provided per light-emitting element 350. A lighting control unit 705-*j* outputs a lighting signal to the analog part 750 via a lighting signal line 708-*j* (j is an integer from 1 to n). The lighting control unit 705-*j* generates a timing signal for a lighting control unit 705-*j*+1 based on the inputted timing signal and supplies the timing signal to the lighting control unit 705-*j*+1 via a signal line 707-*j*+1. As described above, although the lighting control unit 705-1 is supplied a timing signal directly from the timing unit 704, lighting control units 705-2 to 705-*n* are supplied a timing signal from preceding lighting control units 705-1 to 705-*n*−1, respectively.

The analog part 750 drives the light-emitting elements 350-1 to 350-*n* based on pulsed lighting signals generated by the digital part 700.

<Details of Timing Unit>

Figure 9A:
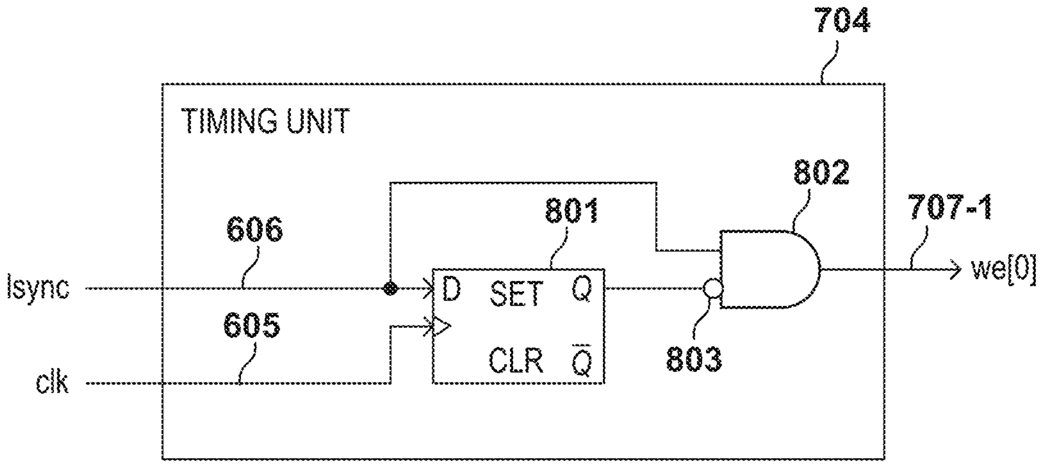
FIGS. 9A and 9B are diagrams for explaining a timing unit.

FIG. 9A is a circuit diagram of the timing unit 704. Here, it is assumed that a line synchronization signal lsync is a negative logic signal; however, the line synchronization signal lsync may also be a positive logic signal. we[1] is a timing signal. The timing unit 704 is a logic circuit for outputting a timing signal we[0] only when the line synchronization signal lsync changes from low to high.

The synchronization signal line 606 and the clock signal line 605 are connected to a delay circuit 801, which delays the line synchronization signal lsync transmitted by the synchronization signal line 606 by one cycle and outputs the line synchronization signal lsync to a logic gate 802. The delay circuit 801 is realized by, for example, a flip-flop circuit.

The logic gate 802 computes a logical product (AND) of a line synchronization signal lsync and a signal obtained by inverting the output signal of the delay circuit 801 by an inversion element 803 and generates a timing signal we[0]. The timing signal we[0] is outputted to the signal line 707-1.

Figure 9B:
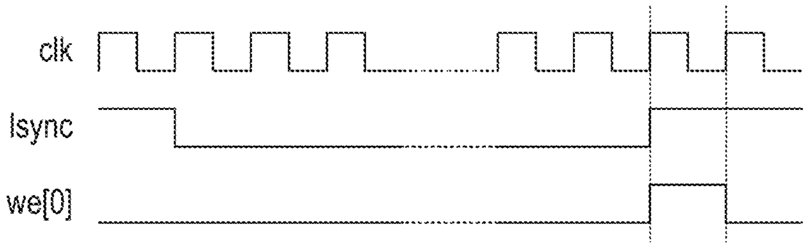

FIG. 9B is a timing chart of the timing unit 704. At a timing when the line synchronization signal lsync changes from low to high, the timing signal we[0] becomes high. The timing signal we[0] remains high for an amount of time corresponding to one cycle of the clock signal clk and then returns to low.

<Details of Lighting Control Unit>

Figure 10A:
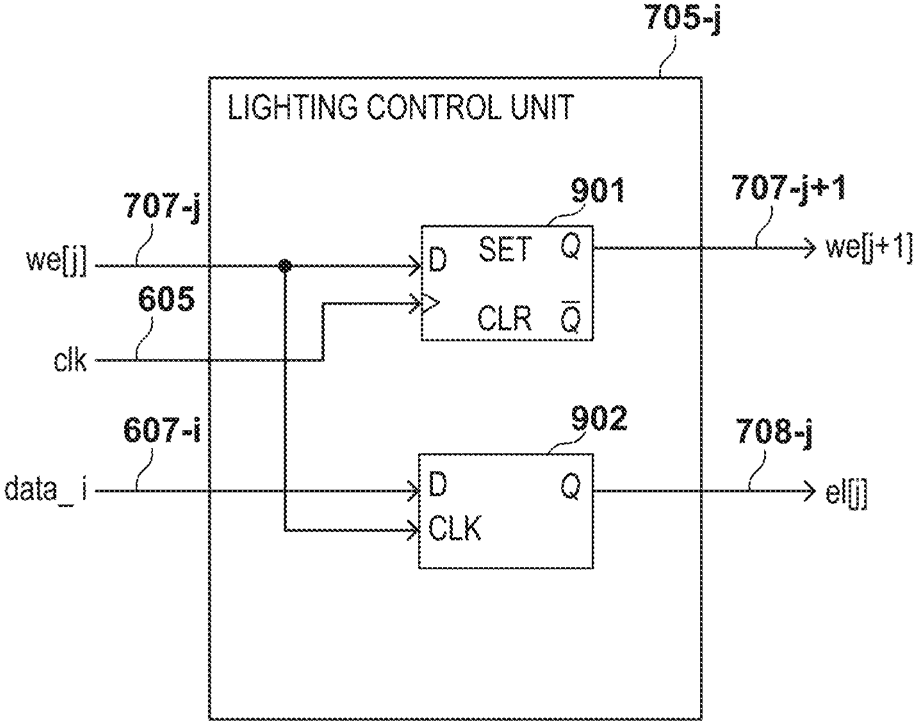
FIGS. 10A to 10C are diagrams for explaining a lighting control unit.

FIG. 10A is a circuit diagram of a j-th lighting control unit 705-*j* in the i-th light-emitting element array 300-*i* (j is an integer from 1 to n). A signal line 707-*j* and the clock signal line 605 are connected to a delay circuit 901. The delay circuit 901 delays a timing signal we[j] transmitted by the signal line 707-*j* by one cycle, generates a timing signal we[j+1] for the subsequent lighting control unit 705-*j*+1, and outputs the timing signal we[j+1] to the signal line 707-*j*+1. The delay circuit 901 need only be able to delay an input signal by an amount of time corresponding to one cycle of the clock signal clk and output the signal. For example, a flip-flop circuit may be employed as the delay circuit 901.

The signal line 707-*j* and an image signal line 607-*i* are connected to a latch circuit 902. The latch circuit 902 obtains the image data data_i during a period in which the timing signal we[j] is high and outputs a lighting signal el[j] to the lighting signal line 708-*j*. In the present embodiment, the latch circuit 902 is employed as a circuit for capturing the image data data_i; however, this is only one example. The circuit need only be able to hold the image data data_i until when the timing signal we[j] becomes high again after the timing signal we[j] becomes high. For example, a flip-flop circuit may be employed in place of the latch circuit 902.

Figure 10B:
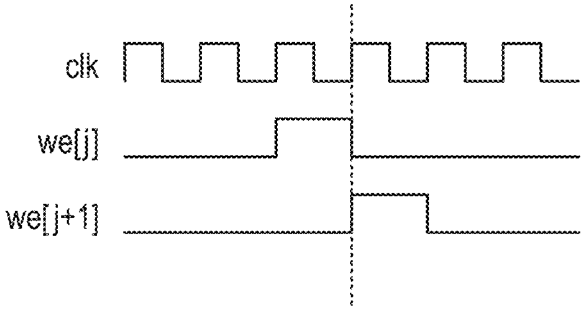

FIG. 10B is a timing chart of the delay circuit 901. The timing signal we[j+1] is generated by delaying the timing signal we[j] by one cycle of the clock signal clk.

Figure 10C:
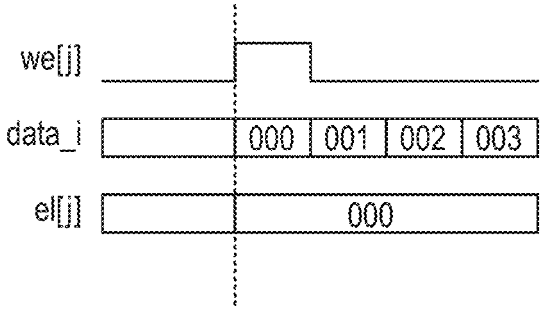

FIG. 10C is a timing chart of the latch circuit 902. The image data data_i (“000” in this example) is obtained during a period in which the timing signal we[j] is high, and the lighting signal el[j] is generated.

<Details of Analog Part>

Figure 11:
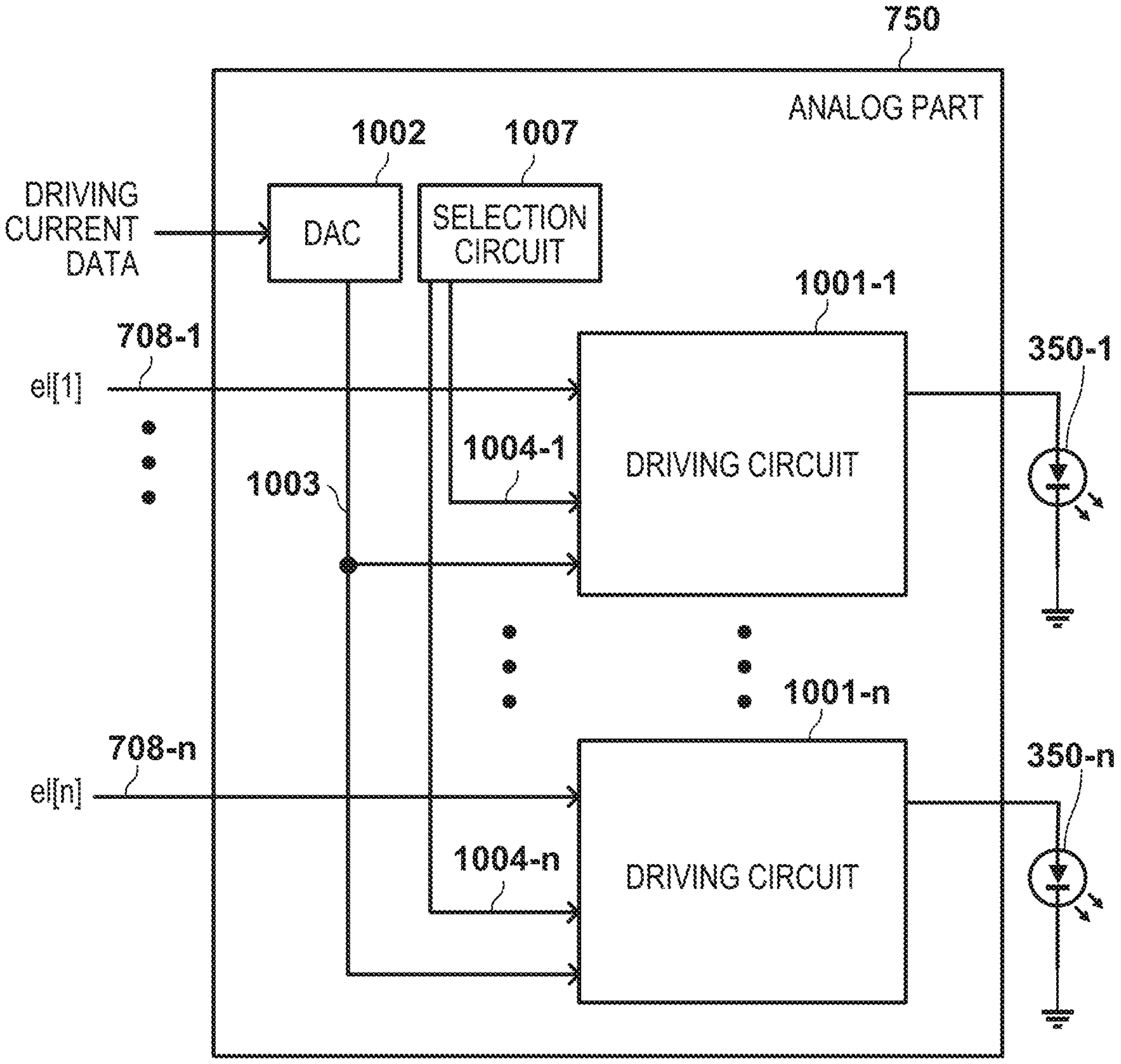
FIG. 11 is a block diagram illustrating an analog part.

FIG. 11 is a block diagram of the analog part 750. For descriptive simplicity, two light-emitting elements 350-1 and 350-*n* and two driving circuits 1001-1 and 1001-*n* are illustrated. In practice, there are n light-emitting elements 350-1 to 350-*n* and *n* driving circuits 1001-1 to 1001-*n*. Here, for generalization, a j-th light-emitting element 350-*j* and a j-th driving circuit 1001-*j* will be described (j is an integer from 1 to n).

The driving circuit 1001-*j* is a circuit for driving the j-th light-emitting element 350-*j*. The driving circuit 1001-*j* is supplied with the lighting signal el[j] via the lighting signal line 708-*j*.

A DAC 1002 converts driving current data set in the register 702 into an analog voltage and supplies the analog voltage to the driving circuits 1001-1 to 1001-*n* via a signal line 1003. DAC is an abbreviation for digital-to-analog converter. Here, the driving current data represents a setting value of a driving current supplied to the light-emitting elements 350-1 to 350-*n*.

A selection circuit 1007 generates a selection signal for selecting a driving circuit 1001 based on the data set in the register 702. The selection circuit 1007 supplies a selection signal to the driving circuits 1001-1 to 1001-*n* via signal lines 1004-1 to 1004-*n*. The selection signal is a signal by which only the signal line connected to one selected driving circuit 1001 among the n driving circuits 1001-1 to 1001-*n* becomes high. If the driving circuit 1001-1 is selected, only the signal line 1004-1 is controlled to be at a high level. The signal lines 1004-2 (not illustrated) to 1001-*n* are controlled to be at a low level. An analog voltage is set for each of the driving circuits 1001-1 to 1001-*n* via the signal line 1003 at the timing at which they are selected by the selection circuit 1007 (a timing at which the selection signal becomes high). The CPU 603 sequentially selects the driving circuits 1001-1 to 1001-*n* one at a time via the register 702 and sets an analog voltage corresponding to the selected driving circuit 1001. This makes it possible to set individual analog voltages to n driving circuits 1001-1 to 1001-*n* using a single DAC 1002. Each of the driving circuits 1001-1 to 1001-*n* thus takes input of the analog voltage, which determines the driving current, and the lighting signal and causes each of the corresponding light-emitting elements 350-1 to 350-*n* to emit light.

<Details of Driving Circuit>

Figure 12:
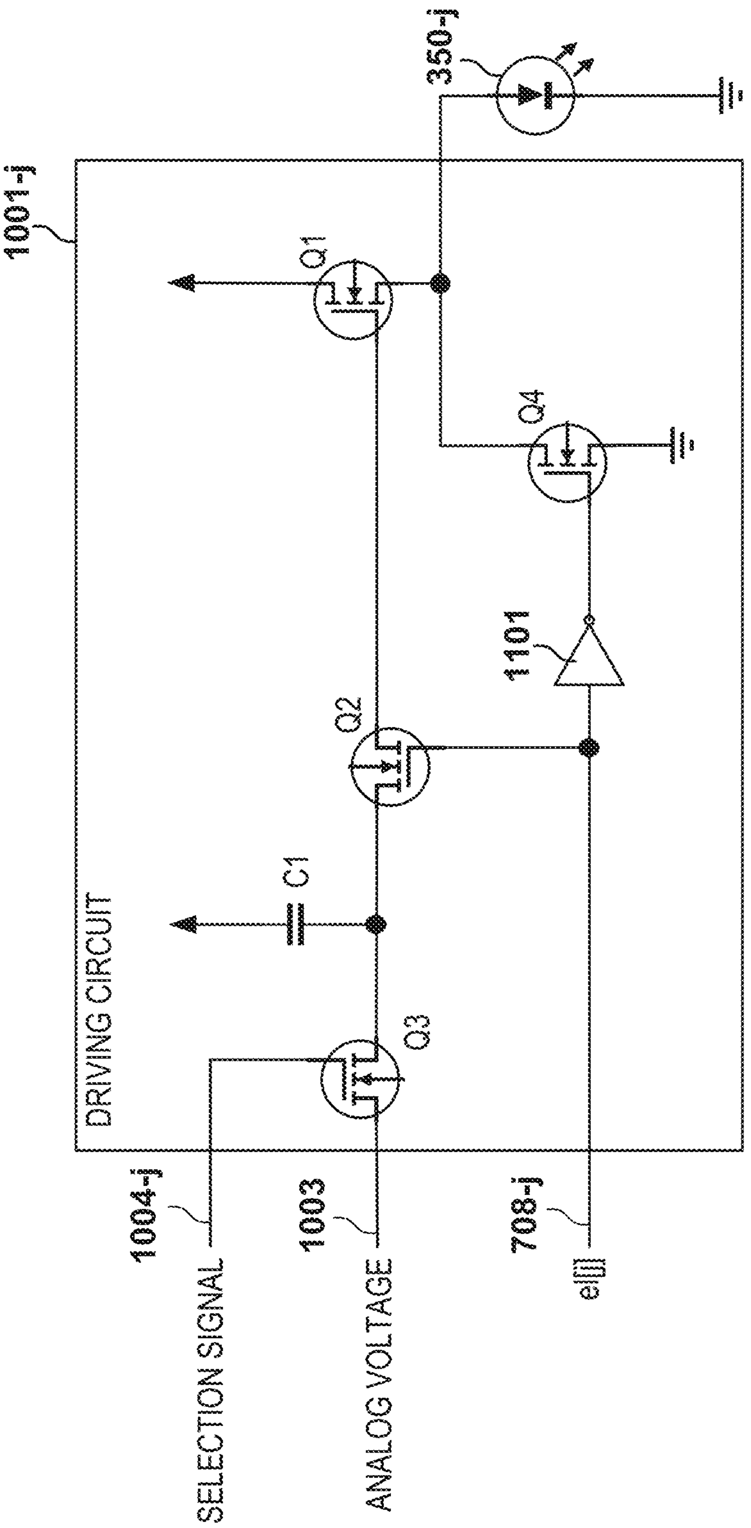
FIG. 12 is a diagram for explaining a driving circuit.

FIG. 12 is a circuit diagram of the j-th driving circuit 1001-*j* (j is an integer from 1 to n). The driving circuits 1001-1 to 1001-*n* all have the same circuit configuration.

A MOSFET Q1 supplies a driving current to the light-emitting element 350-*j* in accordance with a gate voltage applied to a gate. When the gate voltage is at a low level, the driving current decreases, and the light-emitting element 350-*j* turns off. The lighting signal line 708-*j* is connected to a gate of a MOSFET Q2. The MOSFET Q2 turns on when the lighting signal el[j] is high and passes a voltage charged in a capacitor C1 to the MOSFET Q1. A signal line 1004-*j* is connected to a gate of a MOSFET Q3. The MOSFET Q3 turns on and off in accordance with a selection signal from the selection circuit 1007. That is, the MOSFET Q3 turns on when the selection signal is high, applying the analog voltage outputted from the DAC 1002 to the capacitor C1 and charging the capacitor C1. In the present embodiment, the DAC 1002 sets the analog voltage in the capacitor C1 prior to image formation. During an image forming period, the MOSFET Q3 is turned off, and the capacitor C1 continuously maintains a voltage level. By this, the MOSFET Q1 supplies and stops the supply of the driving current corresponding to the set analog voltage to the light-emitting element 350-1 in accordance with the lighting signal.

If an input capacitance of the light-emitting element 350-*j* is too large, a response speed for switching the light-emitting element 350-*j* from on to off becomes slow. Therefore, a MOSFET Q4 and an inverter 1101 may be added to improve the response speed. A signal obtained by inverting a logic of the lighting signal el[j] is inputted into a gate of the MOSFET Q4 by the inverter 1101. When the lighting signal el[j] is at a low level, the gate of MOSFET Q4 is high. Therefore, the MOSFET Q4 turns on, making it possible to forcibly discharge the charge charged in the input capacitance of the light-emitting element 350-*j*.

<Details of Synchronization Unit>

Figure 13:
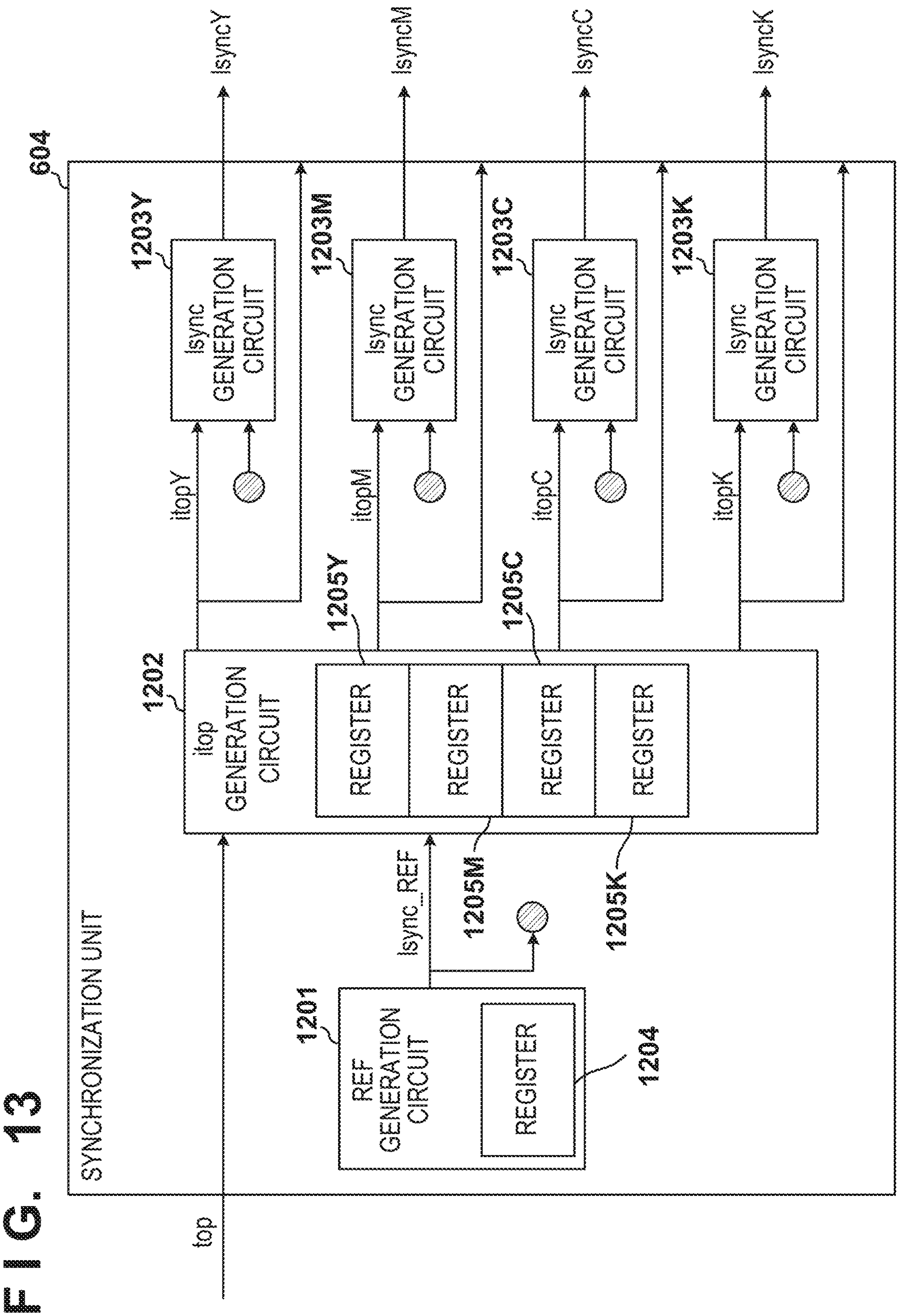
FIG. 13 is a diagram for explaining a synchronization unit.

FIG. 13 is a diagram illustrating a configuration of the synchronization unit 604. An REF generation circuit 1201 generates an lsync_REF signal, which is a synchronization signal that is common to YMCK. The CPU 603 stores lsync_REF_period indicating a period of the lsync_REF signal in a register 1204. The REF generation circuit 1201 generates the lsync_REF signal at a period that accords with lsync_REF_period held in the register 1204. For example, if lsync_REF_period is 1000 cycles, the REF generation circuit 1201 asserts the lsync_REF signal every 1000 cycles of the clock signal clk. That is, the REF generation circuit 1201 may be a counter circuit that counts up each time the clock signal clk is inputted and outputs the lsync_REF signal when a count value coincides with lsync_REF_period.

An itop generation circuit 1202 generates itop signals, each serving as a reference for a timing at which an lsync signal is to be generated. A register 1205 holds topMargin. topMargin is written by the CPU 603 and indicates a margin (delay time) with respect to the top signal. The itop generation circuit 1202 counts the lsync_REF signal a number of times corresponding to topMargin when the top signal is asserted. That is, the itop generation circuit 1202 may be a counter circuit that outputs an itop signal when a count value of the lsync_REF signal reaches topMargin. For example, assume that topMargin Y held in a register 1205Y is 10 and topMarginM held in a register 1205M is 1000. When assertion of the lsync_REF signal is detected ten times after the top signal has been asserted, the itopY signal is outputted. When assertion of the lsync_REF signal is detected 1000 times after the top signal has been asserted, the itopM signal is outputted. The same applies to cyan and black.

Incidentally, in some cases, an i+1-th top signal may be asserted prior to assertion of an i-th itop signal. The itop generation circuit 1202 is configured to, in such cases, assert the i-th itop signal when the count value coincides with topMargin set when the i-th top signal is asserted.

An lsync generation circuit 1203 takes input of an itop signal and the lsync_REF signal. The lsync generation circuit 1203 generates and outputs an lsync signal based on assertion of the itop signal.

<lsync Generation Circuit>

Figure 14A:
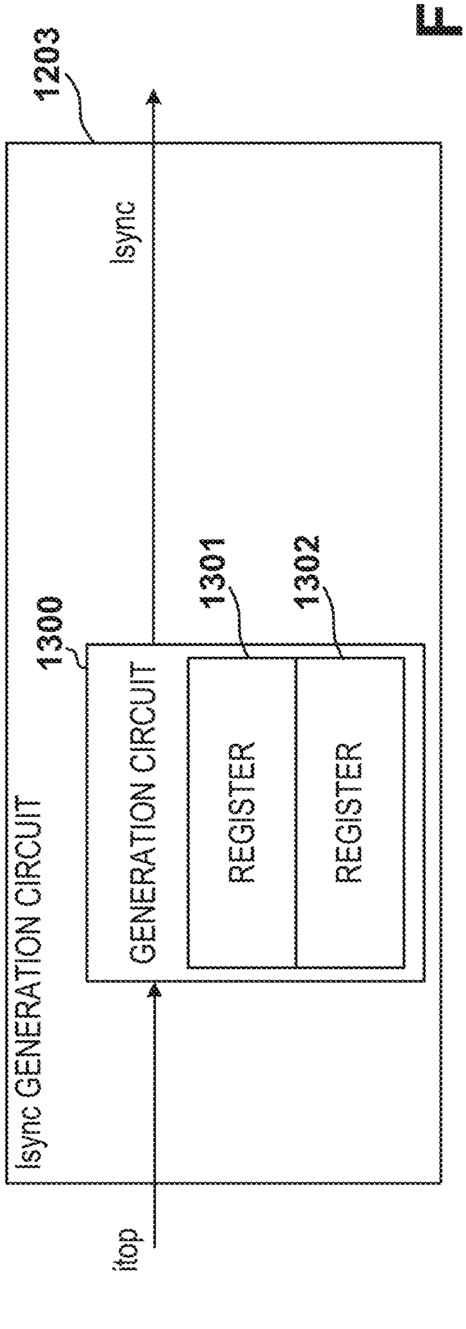
FIGS. 14A and 14B are diagrams for explaining an lsync generation circuit.

FIG. 14A is a diagram illustrating a configuration of an lsync generation circuit 1203. A generation circuit 1300 generates and outputs an lsync signal based on an itop signal. The generation circuit 1300 includes two registers 1301 and 1302 to which information is written by the CPU 603. A register 1301 holds lsync_period, which is a period of the lsync signal. That is, lsync_period is a parameter indicating a line period (interval) corresponding to a resolution in the sub-scanning direction. A register 1302 holds a magnification mag.

Upon detecting assertion of the itop signal, the generation circuit 1300 continues to assert lsync signal at a period obtained by multiplying a period corresponding to lsync_period by the magnification mag. For example, assume a case where lsync_period is 1000 cycles and mag is 100%. In this case, the lsync signal is asserted every 1000 cycles of the clock signal.

Assume that lsync_period is set to 1000 cycles and mag is set to 99%. In this case, the lsync signal is asserted once every 990 cycles of the clock signal. As a result, the size of an image in the sub-scanning direction is slightly reduced.

Assume that lsync_period is set to 1000 cycles and mag is set to 99.99%. In this case, the lsync signal is asserted every 1000 cycles of the clock signal for nine times and then the lsync signal is asserted once in 999 cycles of the clock signal.

As described above, it is possible to assert 10 lsync signals in 10000 cycles of the clock signal clk or assert 10 lsync signals in 9999 cycles of the clock signal clk. In the latter case, it is possible to generate the lsync signal that can set the magnification in the sub-scanning direction to 99.99%.

Figure 14B:
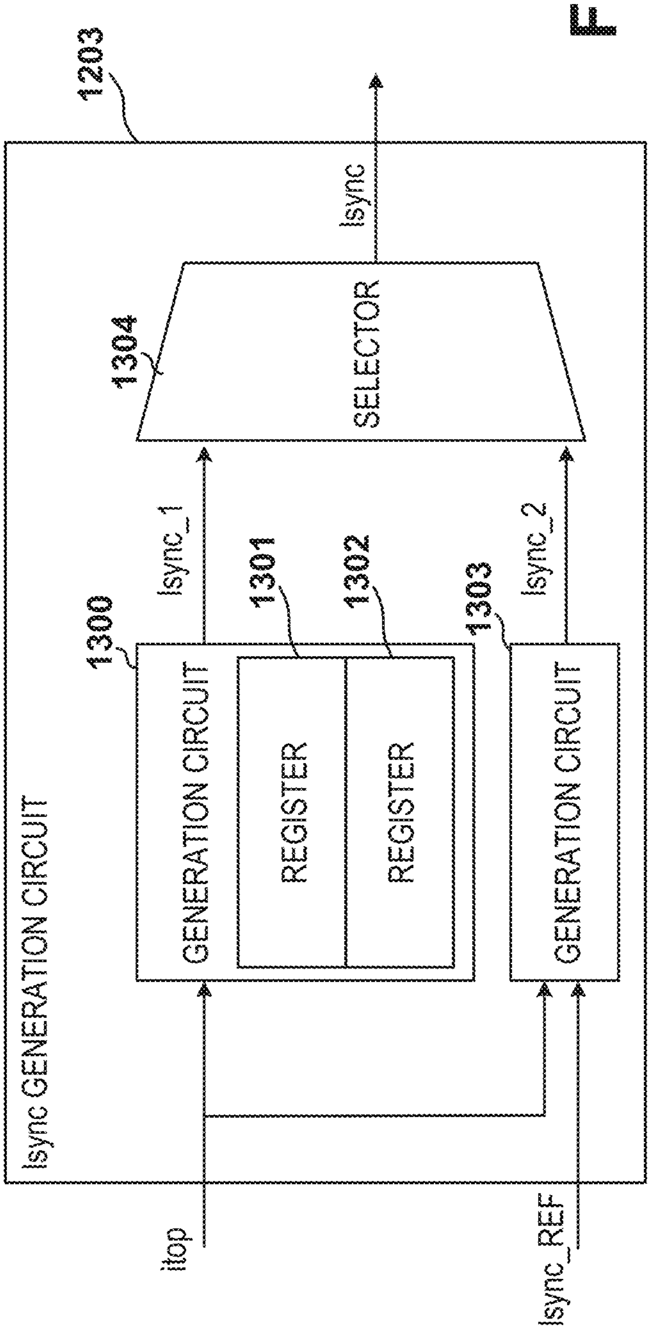

FIG. 14B is a diagram illustrating another example of the configuration of the lsync generation circuit 1203. In this example, the lsync generation circuit 1203 includes a first generation circuit 1300 for generating an lsync_1 signal, a second generation circuit 1303 for generating an lsync_2 signal, and a selector 1304. The operation and configuration of the generation circuit 1300 are as described in connection with FIG. 14A. The selector 1304 selects and outputs either the lsync_1 signal or the lsync_2 signal.

The second generation circuit 1303 may include a register for holding mag. Also, the second generation circuit 1303 generates the lsync_2 signal independent of lsync_period. Specifically, the second generation circuit 1303 generates the lsync_2 signal based on the lsync_REF signal. The selector 1304 outputs either one of the lsync_1 signal or the lsync_2 signal as the lsync signal in accordance with an instruction from the CPU 603.

The first generation circuit 1300 needs two parameters despite being able to easily realize large magnification. The second generation circuit 1303 is able to realize magnification only by having one parameter (magnification) set. Configuration may be taken so as to remove the first generation circuit 1300 and only integrate the second generation circuit 1303.

<How to Read Timing Chart>

Figure 15:
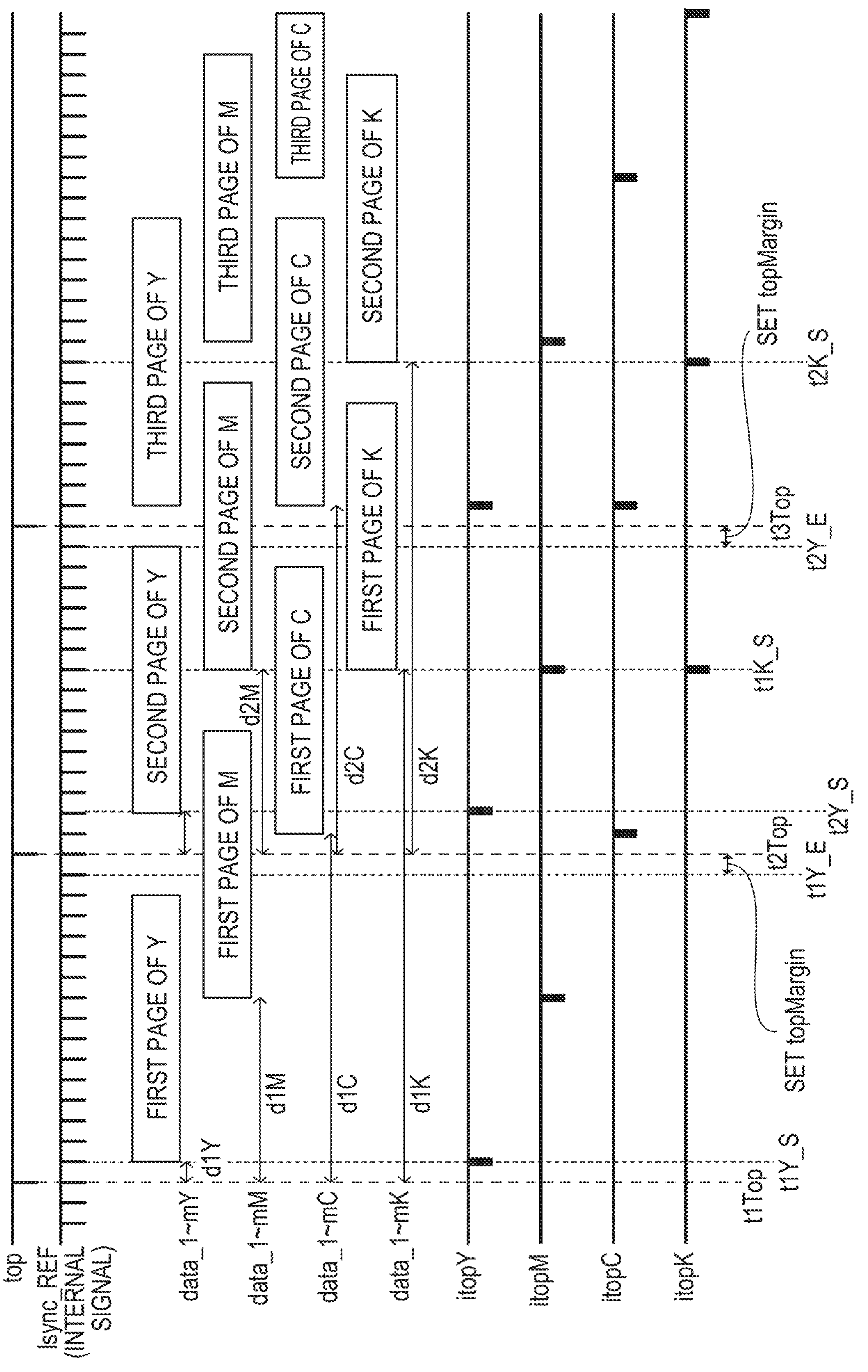
FIG. 15 is a timing chart for explaining operation of the synchronization unit.

FIG. 15 is a timing chart of the top signal, the lsync_REF signal, the image data data, and the itop signal. A delay time d between the drums is expressed as d[n][color]. [n] indicates an n-th page. [color] indicates any one of the YMCK colors. For example, d1Y indicates a delay time for a first page of yellow. t[n]Top indicates a timing at which a top signal of the n-th page is asserted. For example, t1Top indicates a timing at which the top signal of a first page is asserted. t2Top indicates a timing at which the top signal of a second page is asserted.

t[n][color]_S indicates a write start timing of an image for a respective color of the n-th page. Note that t[n][color]_S corresponds to a timing at which an itop signal of a respective color is asserted. For example, t1Y_S indicates a write start timing of a yellow image of the first page. t2K_S indicates a write start timing of a black image of a second page.

t[n][color]_E indicates a timing at which formation of an image for a respective color of the n-th page has been completed. For example, t1Y_E indicates a timing at which formation of the yellow image of the first page has been completed. t2K_E indicates a timing at which formation of the black image of the second page has been completed.

FIG. 15 illustrates input and output of the itop generation circuit 1202, and for the sake of descriptive simplicity, description will be given for the Y color and the K color. However, this description also applies to the M color and the C color.

The CPU 603 sets topMargin for each of YMCK from a timing t[n]Y_E to a timing t[n+1]Top. First, the Y color will be described. The itop generation circuit 1202 detects assertion of the top signal of the first page at the timing t1Top. The itop generation circuit 1202 asserts the itop Y signal at a timing t1Y_S. This is because topMargin of yellow of the first page is set to “1”. That is, the delay time d1Y from the timing t1Top to the timing t1Y_S corresponds to one cycle of the lsync_REF signal.

topMargin is updated from “1” to “2” in a period from t1Y_E to t2Top. The itop generation circuit 1202 detects assertion of the top signal of the second page at the timing t2Top. The itop generation circuit 1202 asserts the itop Y signal at a timing t2Y_S. This is because topMargin of yellow of the second page is set to “2”. That is, a delay time d2Y from the timing t2Top to the timing t2Y_S corresponds to two cycles of the lsync_REF signal.

Next, the K color will be described. A mechanism of the K color is exactly the same as a mechanism of the Y color. However, the top signal of the second page is asserted at the timing t2Top before the itopK signal of the first page is asserted at a timing t1K_S.

That is, the CPU 603 sets topMargin for each of the four colors from the timing t[n]Y_E to the timing t[n+1]Top. The itop generation circuit 1202 stores topMargin for all the colors for when the top signal is asserted and generates an itop signal of each color using topMargin for each color.

Figure 16:
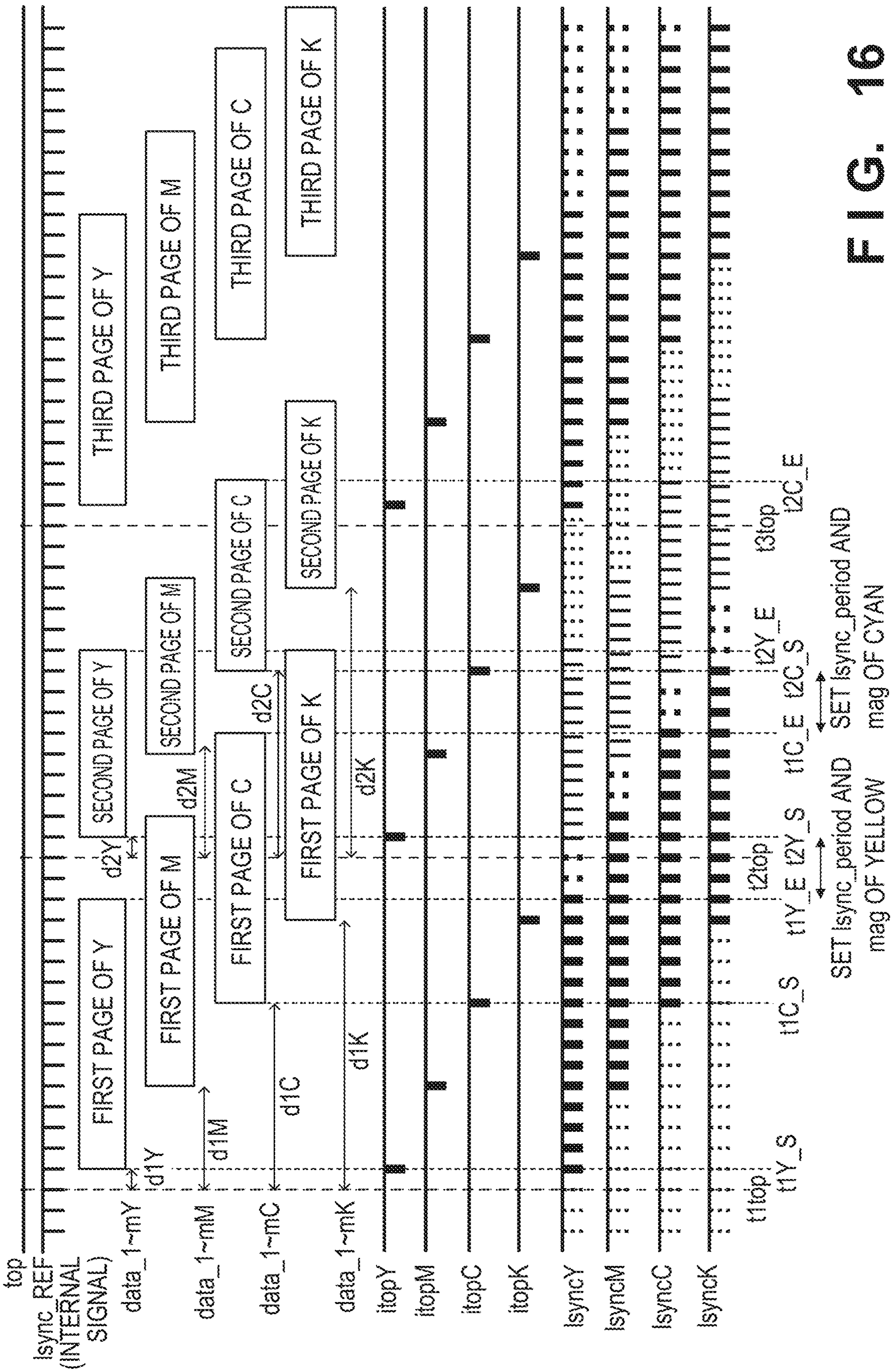
FIG. 16 is a timing chart for explaining operation of the synchronization unit.

FIG. 16 illustrates a timing chart of input to and output from the synchronization unit 604. Here, the Y color and the C color are described as one example; however, this description applies to the M color and the K color. In FIG. 16, a period of an lsync signal for each color is changed among the first page, the second page, and the third page.

The CPU 603 sets lsync_period and mag of a color from the timing t[n][color]_E to a timing t[n+1][color]_S. That is, the parameters related to the magnification are set at different timings for each color.

First, the Y color will be described. Since the top signal and itop signals have been described with reference to FIG. 15, the descriptions thereof will be omitted. The itop generation circuit 1202 detects assertion of the top signal of the first page at the timing t1Top and asserts the itopY signal at the timing t1Y_S. Upon detecting assertion of the itopY signal, the lsync generation circuit 1203 determines a period of the lsyncY signal that accords with lsync_period and mag and outputs the lsyncY signal in accordance with that period.

During a period from t1Y_E to t2Y_S, lsync_period and mag of the second page for yellow are updated. The itop generation circuit 1202 detects assertion of the top signal of the second page at the timing t2Top. The itop generation circuit 1202 asserts the itopY signal at the timing t2Y_S. Upon detecting assertion of the itopY signal, the lsync generation circuit 1203 determines a period at which the lsyncY signal is asserted in accordance with lsync_period and mag and outputs the lsyncY signal in accordance with that period. As described above, in the present embodiment, lsync_period and mag of the Y color are updated in a period from the timing t1Y_E to the timing t2Y_S. As a result, the lsync Y signal whose period is shorter than the period of the first page is generated for the second page.

For the C color, the CPU 603 sets lsync_period and mag of the second page for cyan in a setting period from a timing t1C_E to a timing t2C_S. The itop generation circuit 1202 detects assertion of the top signal of the second page at the timing t2Top. The itop generation circuit 1202 asserts the itopC signal at the timing t2C_S. Upon detecting assertion of the itopC signal, the lsync generation circuit 1203 determines a period at which the lsyncC signal is asserted in accordance with lsync_period and mag and outputs the lsyncC signal in accordance with that period. In the present embodiment, lsync_period and mag of the C color are updated in the period from the timing t1C_E to the timing t2C_S. As a result, the lsyncC signal whose period is shorter than the period of the first page is generated for the second page.

As illustrated in FIG. 16, a timing at which the itopC signal is asserted is different from a timing at which the itopY signal is asserted. Therefore, a timing at which the lsyncC signal switches from the period (magnification) of the first page to the period (magnification) of the second page is different from a timing at which the lsync Y signal switches from the period (magnification) of the first page to the period (magnification) of the second page. In any case, the period (magnification) is not changed partway through the page.

As described above, a delay time from the top signal to an itop signal is counted based on the lsync_REF signal whose period is fixed. Therefore, it is possible to control a write start timing of an image for each of the colors in accordance with positions at which the image forming units 101Y to 101K are physically installed.

Further, periods of line synchronization signals in the sub-scanning direction of YMCK are changed in accordance with write start timings of YMCK images. That is, a period of a line synchronization signal in the sub-scanning direction is changed at an appropriate timing for each color. As a result, the magnification is not changed partway through the page. That is, even when a plurality of pages are to be continuously printed, it is possible to control scaling in the sub-scanning direction.

Second Embodiment

As described above, a period of an lsync signal is determined by a resolution in the sub-scanning direction. For example, if the resolution is 2400 dpi, positions in an image in the sub-scanning direction cannot be corrected at a spacing that is smaller than that resolution. Therefore, in the second embodiment, a mechanism in which an itop signal and an lsync signal for each color are shifted at a spacing that is shorter than the period of the lsync signal is disclosed. As a result, it is possible to correct a shift in a position of an image in the sub-scanning direction with finer accuracy.

<Synchronization Unit>

Figure 17:
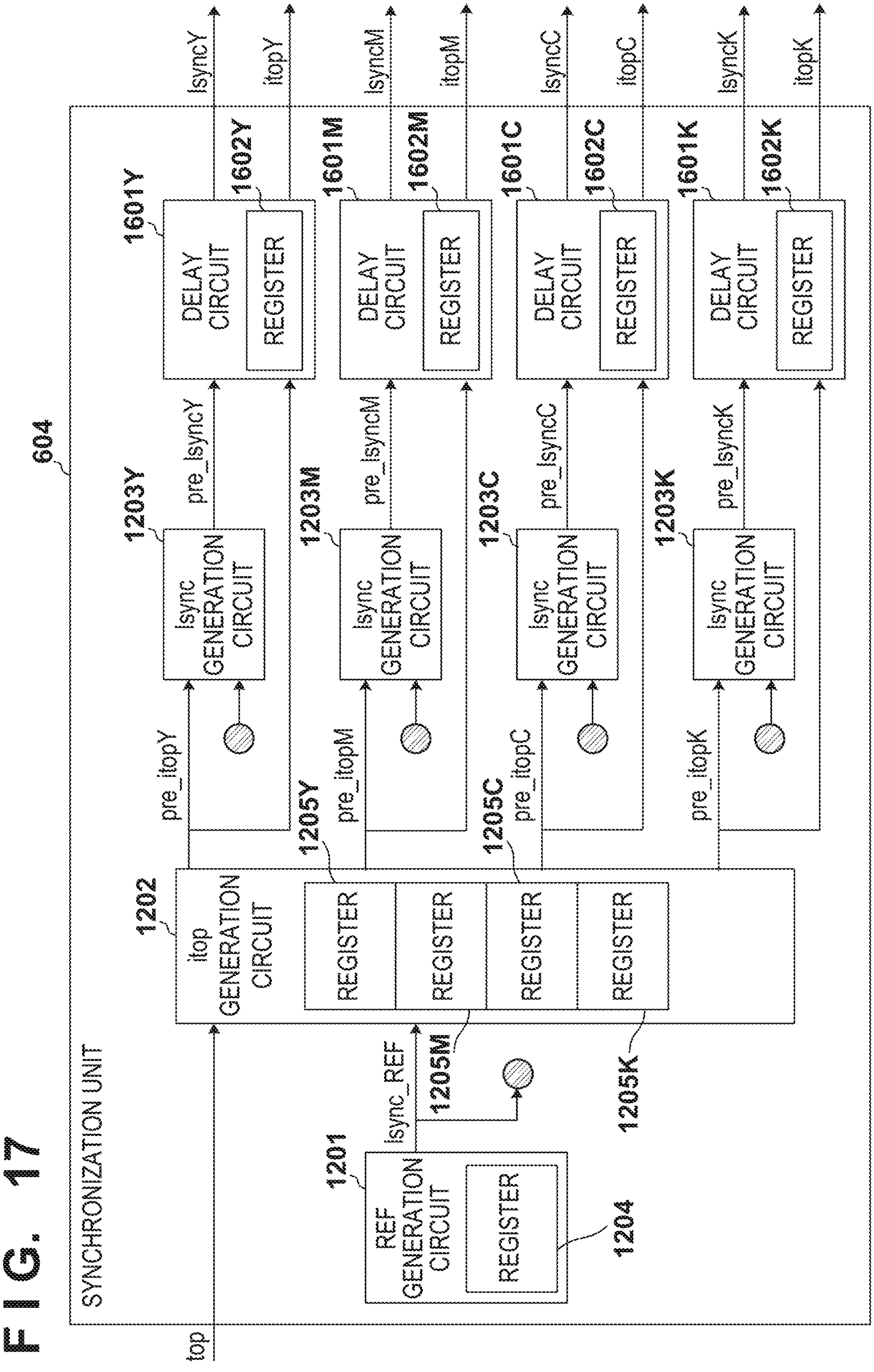
FIG. 17 is a diagram for explaining another exemplary synchronization unit.

FIG. 17 illustrates a configuration of the synchronization unit 604 according to the second embodiment. Among the components illustrated in FIG. 17, the components that have already been described in the first embodiment are assigned the same reference numerals, and the descriptions thereof will be omitted. The YMCK characters attached at the end of the reference numerals may be omitted when matters common to the four colors are described.

As it can be seen from FIG. 17, a delay circuit 1601 has been added for each of YMCK. The itop signals outputted from the itop generation circuit 1202 are referred to as pre_itop signals. The lsync signals outputted from the lsync generation circuits 1203 are referred to as pre_lsync signals. The pre_itop signals and the pre_lsync signals are inputted to the delay circuits 1601.

A delay circuit 1601 includes a register 1602 for holding a delay amount delay set by the CPU 603. The delay circuit 1601 delays the pre_itop signal and the pre_lsync signal by the delay amount delay held in the register 1602 and outputs these as the itop signal and the lsync signal. The delay amount delay held in the register 1602 is defined using the number of cycles of the clock signal clk.

For example, assume that a period of pre_lsync Y and a period of pre_lsyncM correspond to 1000 cycles of the clock signal clk. In addition, 0 cycle is set in the register 1602Y as a delay amount delayY. In addition, 500 cycles are set in the register 1602M as a delay amount delayM. In this case, the itopM signal and the lsyncM signal are outputted by being shifted with respect to the itopY signal and the lsyncY signal by a period corresponding to a half of the period of the lsync signal.

When the resolution in the sub-scanning direction is 2400 dpi, a position of a Y image and a position of an M image in the sub-scanning direction can be shifted by a resolution equivalent to 4800 dpi.

[Technical Concept Derived from Embodiments]

(Aspect 1)

The image forming unit 101Y is an example of a first image forming unit for forming an image corresponding to a first color by exposing one line at a time using a first exposure head. The image forming unit 101M is an example of a second image forming unit for forming an image corresponding to a second color by exposing one line at a time using a second exposure head. The image forming unit 101C is an example of a third image forming unit for forming an image corresponding to a third color by exposing one line at a time using a third exposure head. The image forming unit 101K is an example of a fourth image forming unit for forming an image corresponding to a fourth color by exposing one line at a time using a fourth exposure head. The transfer belt 111 is an example of a transfer unit for forming a full-color image by sequentially transferring the image corresponding to the first color, the image corresponding to the second color, the image corresponding to the third color, and the image corresponding to the fourth color to a sheet. The synchronization unit 604 is an example of a first generation unit for generating a line synchronization signal for each color at a period corresponding to a resolution of an image in the sub-scanning direction. The CPU 603 is an example of a control unit for controlling a period of the line synchronization signal according to a magnification in the sub-scanning direction for each page as well as controlling write start timings of individual images for respective colors. The CPU 603 and the synchronization unit 604 change the period of the line synchronization signal for each page, using the write start timings of individual images for respective color as a reference. This makes it possible to change the magnification for each page in an image forming apparatus for forming a color image. That is, the magnification is not changed partway through the page. Further, it is possible to prevent an image from being distorted when the magnification in the sub-scanning direction of the image to be formed on a printing medium is changed for each page.

(Aspect 2)

The lsync generation circuit 1203Y is an example of a first creation unit for creating a line synchronization signal for the image corresponding to the first color. The lsync generation circuit 1203M is an example of a second creation unit for creating a line synchronization signal for the image corresponding to the second color. The lsync generation circuit 1203C is an example of a third creation unit for creating a line synchronization signal for the image corresponding to the third color. The lsync generation circuit 1203K is an example of a fourth creation unit for creating a line synchronization signal for the image corresponding to the fourth color. The first creation unit, the second creation unit, the third creation unit, and the fourth creation unit change the period of the line synchronization signal with reference to the write start timing of the individual images for respective colors.

(Aspect 3)

The host controller 690 is an example of a second generation unit for generating a common leading edge signal (e.g., a top signal) serving as a reference for a leading edge in the sub-scanning direction of each page. The registers 1025Y to 1025K are examples of a holding unit for holding a delay time from an output timing of the common leading edge signal to a write start timing of an image for each color. The itop generation circuit 1202 is an example of a third generation unit for generating individual leading edge signals indicating individual write start timings for respective colors by applying individual delay times for respective colors to the output timing of the common leading edge signal. The first creation unit, the second creation unit, the third creation unit, and the fourth creation unit change the period of the line synchronization signal using the individual leading edge signals (e.g., itopY to itopK) for respective colors as references.

(Aspect 4)

The REF generation circuit 1201 is an example of a fourth generation unit for generating a reference synchronization signal that is common to the first color, the second color, the third color, and the fourth color. The third generation unit (e.g., the itop generation circuit 1202) generates individual leading edge signals for respective colors in accordance with the delay times for respective colors using the reference synchronization signal as a reference.

(Aspect 5)

The CPU 603 and the registers 1205Y to 1205K are examples of a first setting unit for setting a delay time for each color. As illustrated in FIG. 15, the first setting unit sets the delay time for each color in the third generation unit after the image corresponding to the first color of the i-th page has been formed and before the common leading edge signal of the i+1-th page is outputted.

(Aspect 6)

As illustrated in FIG. 15, the image corresponding to the first color (e.g., yellow) is formed before the image corresponding to the second color (e.g., magenta), the image corresponding to the third color (e.g., cyan), and the image corresponding to the fourth color (e.g., black).

(Aspects 7 and 8)

The clock unit 608 is an example of a clock unit for generating a clock signal (e.g., clk). The first creation unit, the second creation unit, the third creation unit, and the fourth creation unit output the line synchronization signal for each color every time a count value of the clock signal becomes a predetermined value. The first creation unit, the second creation unit, the third creation unit, and the fourth creation unit may be implemented by a counter circuit. Here, the predetermined value may be a value obtained by multiplying a reference count value of the clock signal by the magnification.

(Aspect 9)

Each of the first creation unit, the second creation unit, the third creation unit, and the fourth creation unit may include a first holding unit (e.g., the register 1301) for holding the reference count value and a second holding unit (e.g., the register 1302) for holding the magnification. The CPU 603 is an example of a second setting unit for setting the reference count value and the magnification.

(Aspect 10)

The predetermined value may be increased or decreased in units of clock signals. That is, the magnification may be increased or decreased by one clock.

(Aspect 11)

The CPU 603 sets the reference count value in the first holding unit of the first creation unit and sets the magnification in the second holding unit of the first creation unit from when the image corresponding to the first color of the i-th page has been completed until formation of the image corresponding to the first color of the i+1-th page is started. The CPU 603 sets the reference count value in the first holding unit of the second creation unit and sets the magnification in the second holding unit of the second creation unit from when the image corresponding to the second color of the i-th page has been completed until formation of the image corresponding to the second color of the i+1-th page is started. The CPU 603 sets the reference count value in the first holding unit of the third creation unit and sets the magnification in the second holding unit of the third creation unit from when the image corresponding to the third color of the i-th page has been completed until formation of the image corresponding to the third color of the i+1-th page is started. The CPU 603 sets the reference count value in the first holding unit of the fourth creation unit and sets the magnification in the second holding unit of the fourth creation unit from when the image corresponding to the fourth color of the i-th page has been completed until formation of the image corresponding to the fourth color of the i+1-th page is started.

(Aspects 12 and 13)

The delay circuit 1601 is an example of a first delay unit for delaying individual leading edge signals for respective colors. The first delay unit delays the individual leading edge signals for respective colors by a time shorter than the period of the line synchronization signal. This makes it possible to finely adjust a leading edge position of the image in the sub-scanning direction.

(Aspects 14 and 15)

The delay circuit 1601 is an example of a second delay unit for delaying the line synchronization signal for each color. The second delay unit delays the line synchronization signal for each color by a time shorter than the period of the line synchronization signal. This makes it possible to finely adjust a formation position of the image in the sub-scanning direction.

(Aspect 16)

The period of the line synchronization signal is changed for each page using the write start timings of individual images for respective colors as a reference such that the magnifications of the four colors for each page coincide. The magnifications of the four colors are a magnification in the sub-scanning direction of the image corresponding to the first color, a magnification in the sub-scanning direction of the image corresponding to the second color, a magnification in the sub-scanning direction of the image corresponding to the third color, and a magnification in the sub-scanning direction of the image corresponding to the fourth color.

(Aspect 17)

The selector 1304 is an example of a selection circuit for selecting either the line synchronization signal generated by a first generation circuit or the line synchronization signal generated by a second generation circuit. The generation circuit 1303 is configured to generate the line synchronization signal based on a common reference synchronization signal. The selection circuit (e.g., the selector 1304) selects a line synchronization signal designated by the control unit from the line synchronization signal generated by the first generation circuit or the line synchronization signal generated by the second generation circuit.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-048420, filed Mar. 24, 2022 which is hereby incorporated by reference herein in its entirety.

What is claimed is:

1. An image forming apparatus comprising:

a first photosensitive drum configured to be rotationally driven;

a first exposure head including a first plurality of light-emitting portions arranged in a direction along an axis of rotation of the first photosensitive drum, and configured to form an image corresponding to a first color on a surface of the first photosensitive drum by light emitted from the first plurality of light-emitting portions;

a second photosensitive drum configured to be rotationally driven;

a second exposure head including a second plurality of light-emitting portions arranged in a direction along an axis of rotation of the second photosensitive drum, and configured to form an image corresponding to a second color on a surface of the second photosensitive drum by light emitted from the second plurality of light-emitting portions; and at least one processor configured to:

(1) generate, by a first synchronization signal generation circuit corresponding to the first color, a first synchronization signal at a cycle in which the surface of the first photosensitive drum moves by a size of one pixel in the image corresponding to the first color in a direction corresponding to a direction of rotation of the first photosensitive drum, (2) generate, by a second synchronization signal generation circuit corresponding to the second color, a second synchronization signal at a cycle in which the surface of the second photosensitive drum moves by the size of one pixel in the image corresponding to the second color in a direction of rotation of the second photosensitive drum; and (3) cause the first exposure head to form one line of the image corresponding to the first color along the axis of rotation of the first photosensitive drum based on the first synchronization signal, and cause the second exposure head to form one line of the image corresponding to the second color along the axis of rotation of the second photosensitive drum based on the second synchronization signal, wherein the first synchronization signal generation circuit includes a first counter configured to count a clock signal and to output the first synchronization signal when a count value of the first counter reaches a first predetermined value, wherein the second synchronization signal generation circuit includes a second counter configured to count the clock signal and to output the second synchronization signal when a count value of the second counter reaches a second predetermined value, and wherein the first counter and the second counter count the clock signal independently of each other.

2. The image forming apparatus according to claim 1, wherein the first predetermined value and the second predetermined value are settable independently of each other.

3. The image forming apparatus according to claim 1, wherein the first synchronization signal generation circuit includes a first register configured to hold the first predetermined value, and wherein the second synchronization signal generation circuit includes a second register configured to hold the second predetermined value.

4. The image forming apparatus according to claim 3, wherein the at least one processor is configured to determine the first predetermined value based on (1) a first reference value corresponding to a reference cycle of the first synchronization signal and (2) a first magnification for the image corresponding to the first color, and wherein the at least one processor is configured to determine the second predetermined value based on (1) a second reference value corresponding to a reference cycle of the second synchronization signal and (2) a second magnification for the image corresponding to the second color.

5. The image forming apparatus according to claim 4, wherein the first magnification and the second magnification are settable independently of each other.

6. The image forming apparatus according to claim 1, wherein the at least one processor is configured to:

generate a common leading edge signal serving as a reference for a leading edge of each page;

generate a first individual leading edge signal indicating a write start timing of the image corresponding to the first color by applying a first delay time to the common leading edge signal; and generate a second individual leading edge signal indicating a write start timing of the image corresponding to the second color by applying a second delay time to the common leading edge signal.

7. The image forming apparatus according to claim 6, wherein the first synchronization signal generation circuit is configured to start generation of the first synchronization signal in response to the first individual leading edge signal, and wherein the second synchronization signal generation circuit is configured to start generation of the second synchronization signal in response to the second individual leading edge signal.

8. The image forming apparatus according to claim 6, wherein the at least one processor is configured to generate a reference synchronization signal common to the first color and the second color, wherein the first individual leading edge signal is generated by counting the reference synchronization signal by a number corresponding to the first delay time after the common leading edge signal is generated, and wherein the second individual leading edge signal is generated by counting the reference synchronization signal by a number corresponding to the second delay time after the common leading edge signal is generated.

9. The image forming apparatus according to claim 1, wherein the at least one processor is configured to update the first predetermined value for an image of an (i+1)-th page corresponding to the first color after formation of an image of an i-th page corresponding to the first color is completed and before formation of the image of the (i+1)-th page corresponding to the first color is started, and wherein the at least one processor is configured to update the second predetermined value for an image of the (i+1)-th page corresponding to the second color after formation of an image of the i-th page corresponding to the second color is completed and before formation of the image of the (i+1)-th page corresponding to the second color is started.

10. The image forming apparatus according to claim 9, wherein a timing at which a cycle of the first synchronization signal is changed from a cycle for the i-th page to a cycle for the (i+1)-th page is different from a timing at which a cycle of the second synchronization signal is changed from a cycle for the i-th page to a cycle for the (i+1)-th page.

11. The image forming apparatus according to claim 1, wherein at a timing at which the first exposure head starts forming an image of a subsequent page corresponding to the first color, the second exposure head is forming an image of a preceding page corresponding to the second color, and wherein the at least one processor is configured to change a cycle of the first synchronization signal for the subsequent page while maintaining a cycle of the second synchronization signal for the preceding page.

12. The image forming apparatus according to claim 1, wherein the second synchronization signal generation circuit generates the second synchronization signal based on the count value of the second counter without delaying the first synchronization signal.

13. The image forming apparatus according to claim 1, wherein the first predetermined value and the second predetermined value are different from each other.

14. The image forming apparatus according to claim 1, wherein the first counter starts counting the clock signal in response to a first individual leading edge signal corresponding to the first color, and wherein the second counter starts counting the clock signal in response to a second individual leading edge signal corresponding to the second color.

15. The image forming apparatus according to claim 1, further comprising:

a transfer unit configured to transfer toner images corresponding to the first color and the second color to a first surface of a sheet;

a fixing unit configured to fix the toner images to the first surface of the sheet; and a conveyance unit configured to invert the sheet and convey the sheet so that toner images are formed on a second surface opposite to the first surface, wherein a cycle of the first synchronization signal for forming an image to be fixed to the second surface is shorter than a cycle of the first synchronization signal for forming an image to be fixed to the first surface, and wherein a cycle of the second synchronization signal for forming an image to be fixed to the second surface is shorter than a cycle of the second synchronization signal for forming an image to be fixed to the first surface.

16. The image forming apparatus according to claim 1, further comprising a delay circuit configured to delay at least one of the first synchronization signal and the second synchronization signal by a delay amount shorter than the cycle of the at least one of the first synchronization signal and the second synchronization signal.

17. The image forming apparatus according to claim 6, further comprising a delay circuit configured to delay at least one of the first individual leading edge signal and the second individual leading edge signal by a delay amount shorter than the cycle of at least one of the first synchronization signal and the second synchronization signal.

18. The image forming apparatus according to claim 1, wherein the first plurality of light emitting portions and the second plurality of light-emitting portions are organic electro-luminescence light emitting elements.

* * * * *